(12) United States Patent
Iwanaga et al.

(10) Patent No.: US 11,547,069 B2
(45) Date of Patent: *Jan. 10, 2023

(54) WATER PURIFICATION PARTICLES, WATER CULTURE APPARATUS, AND WATER PURIFICATION APPARATUS

(71) Applicant: FUJIFILM Business Innovation Corp., Tokyo (JP)

(72) Inventors: Takeshi Iwanaga, Kanagawa (JP); Hiroyoshi Okuno, Kanagawa (JP); Hideaki Yoshikawa, Kanagawa (JP); Sakae Takeuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 757 days.

This patent is subject to a terminal disclaimer.

(21) Appl. No.: 16/528,636

(22) Filed: Aug. 1, 2019

(65) Prior Publication Data

US 2020/0288655 A1    Sep. 17, 2020

(30) Foreign Application Priority Data

Mar. 15, 2019  (JP) .............................. JP2019-048832

(51) Int. Cl.
*A01G 31/02* (2006.01)
*C02F 1/72* (2006.01)
(Continued)

(52) U.S. Cl.
CPC .............. *A01G 31/02* (2013.01); *B01J 21/06* (2013.01); *B01J 21/063* (2013.01); *B01J 21/08* (2013.01); *B01J 35/004* (2013.01); *B01J 35/0013* (2013.01); *B01J 35/026* (2013.01); *B01J 35/1009* (2013.01); *B01J 35/1014* (2013.01);
(Continued)

(58) Field of Classification Search
CPC ... A01G 31/02; A01G 2031/006; B01J 21/06; B01J 21/063; B01J 21/08; B01J 35/0013; B01J 35/026; B01J 35/1009; B01J 35/1014; B01J 35/1019; C02F 1/30; C02F 1/725;
(Continued)

(56) References Cited

U.S. PATENT DOCUMENTS 7,851,402 B2 * 12/2010 Cunningham ......... C01G 19/02
502/157
7,910,515 B2 *  3/2011 Vormberg ............. B01J 37/349
423/613
(Continued)

FOREIGN PATENT DOCUMENTS

DE        69637493    *  1/2009   ......... C03C 2217/45
JP        H 05 309267  * 11/1993   ............. B01J 21/06
(Continued)

*Primary Examiner* — Patricia L. Hailey
(74) *Attorney, Agent, or Firm* — JCIPRNET

(57) ABSTRACT

Water purification particles have porous particles and photocatalyst particles formed of titanium-based compound particles that are supported on the porous particles, have absorption at a wavelength of 500 nm in a visible absorption spectrum, and have an absorption peak at 2,700 $cm^{-1}$ to 3,000 $cm^{-1}$ in an infrared absorption spectrum, and a metal compound having a metal atom and a hydrocarbon group is bonded to the surface of each of the titanium-based compound particles through an oxygen atom.

22 Claims, 6 Drawing Sheets

US 11,547,069 B2
Page 2

(51) Int. Cl.
  *B01J 21/06* (2006.01)
  *B01J 21/08* (2006.01)
  *B01J 35/00* (2006.01)
  *B01J 35/10* (2006.01)
  *B01J 35/02* (2006.01)
  *C02F 1/30* (2006.01)
  *A01G 31/00* (2018.01)
  *C02F 103/26* (2006.01)

(52) U.S. Cl.
  CPC .......... *B01J 35/1019* (2013.01); *C02F 1/30* (2013.01); *C02F 1/725* (2013.01); *A01G 2031/006* (2013.01); *C02F 2103/26* (2013.01); *C02F 2303/04* (2013.01); *C02F 2305/10* (2013.01)

(58) Field of Classification Search
  CPC .......... C02F 2103/26; C02F 2303/04; C02F 2305/10
  USPC ........... 502/350, 158, 161; 47/62 N, 65.5, 47/58.1 LS
  See application file for complete search history.

(56) References Cited

U.S. PATENT DOCUMENTS

| | | | |
|---|---|---|---|
| 11,040,899 B2* | 6/2021 | Okuno | B01J 37/0221 |
| 2001/0025008 A1* | 9/2001 | Hu | B01J 37/0203 |
| | | | 502/239 |
| 2002/0169076 A1* | 11/2002 | Takeshi | B01J 37/0238 |
| | | | 502/208 |
| 2018/0280933 A1* | 10/2018 | Okuno | B01J 21/063 |
| 2018/0280953 A1* | 10/2018 | Iwanaga | C07F 7/28 |
| 2019/0224648 A1* | 7/2019 | Yoshikawa | B01J 37/0225 |
| 2020/0085060 A1* | 3/2020 | Okuno | B01J 21/063 |
| 2020/0288652 A1* | 9/2020 | Yoshikawa | C23C 22/00 |
| 2020/0290906 A1* | 9/2020 | Okuno | B01J 35/1019 |

FOREIGN PATENT DOCUMENTS

| | | | | |
|---|---|---|---|---|
| JP | H08 281121 | * | 10/1996 | ............. B01J 21/04 |
| JP | H 10 216528 | * | 8/1998 | ............. B01J 35/02 |
| JP | H 10 249210 | * | 9/1998 | ............. Y02P 60/216 |
| JP | H10249210 | | 9/1998 | |
| JP | 2001198472 | | 7/2001 | |
| JP | 2001240759 | | 9/2001 | |
| JP | 2004027428 | | 1/2004 | |
| JP | 2004082095 | | 3/2004 | |
| JP | 2004337836 | | 12/2004 | |
| JP | 2006238717 | | 9/2006 | |
| JP | 2006320282 | | 11/2006 | |
| JP | 2007089425 | | 4/2007 | |
| JP | 2010094026 | | 4/2010 | |
| JP | 2011172539 | | 9/2011 | |
| JP | 2012006003 | | 1/2012 | |
| JP | 2012 055893 | * | 3/2012 | ............. B01J 35/02 |
| JP | 2014226108 | | 12/2014 | |
| WO | WO-2014155077 A1 | * | 10/2014 | ............. B01J 21/16 |
| WO | 2015059752 | | 4/2015 | |

* cited by examiner

WATER PURIFICATION PARTICLES, WATER CULTURE APPARATUS, AND WATER PURIFICATION APPARATUS

CROSS-REFERENCE TO RELATED APPLICATIONS

This application is based on and claims priority under 35 USC 119 from Japanese Patent Application No. 2019-048832 filed Mar. 15, 2019.

BACKGROUND

(i) Technical Field

The present invention relates to water purification particles, a water culture apparatus, and a water purification apparatus.

(ii) Related Art

Conventionally, water culture for producing plants such as vegetables, fruits, and flowers has been performed. In the water culture, in order to inhibit the growth of pathogens and the like in the culture solution, water purification is performed.

For example, JP2004-082095A discloses "a method and an apparatus for treating an agricultural liquid, in which a purification treatment is performed on an agricultural liquid by using a photocatalyst support and using only sunlight as light for causing a photoreaction of a photocatalyst, and in the photocatalyst support, as a photocatalyst, a microporous film is formed by firing a film that is obtained by coating a porous substrate with a metal alkoxide-containing photoreactive semiconductor and drying and coagulating the semiconductor".

JP2004-337836A discloses "a photocatalytic substance which includes a photocatalyst layer capable of reacting with sunlight on a surface of a porous substrate, has a porosity that enables light to permeate into the interior of the photocatalytic substance in a thickness direction, and has a shape that can be extended in the form of a plane". JP2004-337836A also discloses the use of the photocatalytic substance for an agricultural liquid.

JP2011-172539A discloses "a culture apparatus that sterilizes a culture solution for the water culture of plants by irradiating the culture solution with light having a wavelength equal to or shorter than 400 nm in a photoscreened tank in which the wall surface thereof is coated with a photocatalyst".

WO15/059752A discloses "a water culture apparatus using glass beads supporting a photocatalyst as a medium of a water culture system, in which the adhesion of infectious microbes to the medium is prevented by irradiating a photocatalyst supporting portion with ultraviolet rays".

JP2014-226108A discloses "a liquid purification apparatus including a light source, a light scattering device, and a photocatalytic substance disposed around the light scattering device, in which the photocatalytic substance is supported on a support and immersed in a liquid medium."

JP2006-238717A discloses "a culture medium housing tool in which a titanium oxide film is formed whose surface is doped with carbon in the form of a Ti—C bond by a heating treatment performed on a titanium plate at a high temperature".

JP2007-089425A discloses "an apparatus for purifying a liquid for plant cultivation that purifies a liquid for plant cultivation by adding an apatite-containing photocatalyst to the liquid for plant cultivation and circulating the photocatalyst".

JP2010-094026A discloses "a water storage apparatus in which water is purified by filling a water storage tank for cultivation with glass beads coated with a visible light-type photocatalyst and circulating water".

JP2006-320282A discloses "a sterilization apparatus for circulating and supplying a culture solution, including a treatment tank which is for performing a sterilization treatment on an excess of a culture solution supplied to a culture bed from a culture solution tank and a sterilization member (non-woven cloth containing chelated silver ions) which contains an antibacterial active metal compound constituting a photocatalyst capable of performing a sterilizing action by light irradiation, in which the excess of the culture solution is circulated between the treatment tank and the sterilization apparatus such that the excess of the culture solution is sterilized".

JP1998-249210A (Alias: JP H10-249210A) discloses "a method for sterilizing a culture solution for water culture, including passing a culture solution through a photocatalytic substance having a specific gravity adjusted for the photocatalytic substance to float on and/or sink in water and radiating light including ultraviolet rays, in which the photocatalytic substance is obtained by fixing photocatalyst particles to the surface of hollow glass particle substrates by using an inorganic substance as a binder".

SUMMARY

Aspects of non-limiting embodiments of the present disclosure relate to water purification particles that more sterilize and purify an aqueous medium while further inhibiting the insolubilization of an organic substance or an ion in the aqueous medium, compared to water purification particles including porous particles and photocatalyst particles formed of titanium-based compound particles supported on the porous particles and having absorption only in the range of ultraviolet.

Other aspects of non-limiting embodiments of the present disclosure relate to medium particles for water culture that sterilize and purify a culture solution while further inhibiting the inactivation of culture components in the culture solution, compared to medium particles for water culture including porous particles and photocatalyst particles formed of titanium-based compound particles supported on the porous particles and having absorption only in the range of ultraviolet.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there are provided water purification particles including porous particles and photocatalyst particles formed of a titanium-based compound particles that are supported on the porous particles, have absorption at a wavelength of 500 nm in a visible absorption spectrum, and have an absorption peak at 2,700 $cm^{-1}$ to 3,000 $cm^{-1}$ in an infrared absorption spectrum, in which a metal compound having a metal atom and a hydrocarbon group is bonded to the surface of each of the titanium-based compound particles through an oxygen atom.

BRIEF DESCRIPTION OF THE DRAWINGS

Exemplary embodiment(s) of the present invention will be described in detail based on the following figures, wherein.

DETAILED DESCRIPTION

Figure 1:
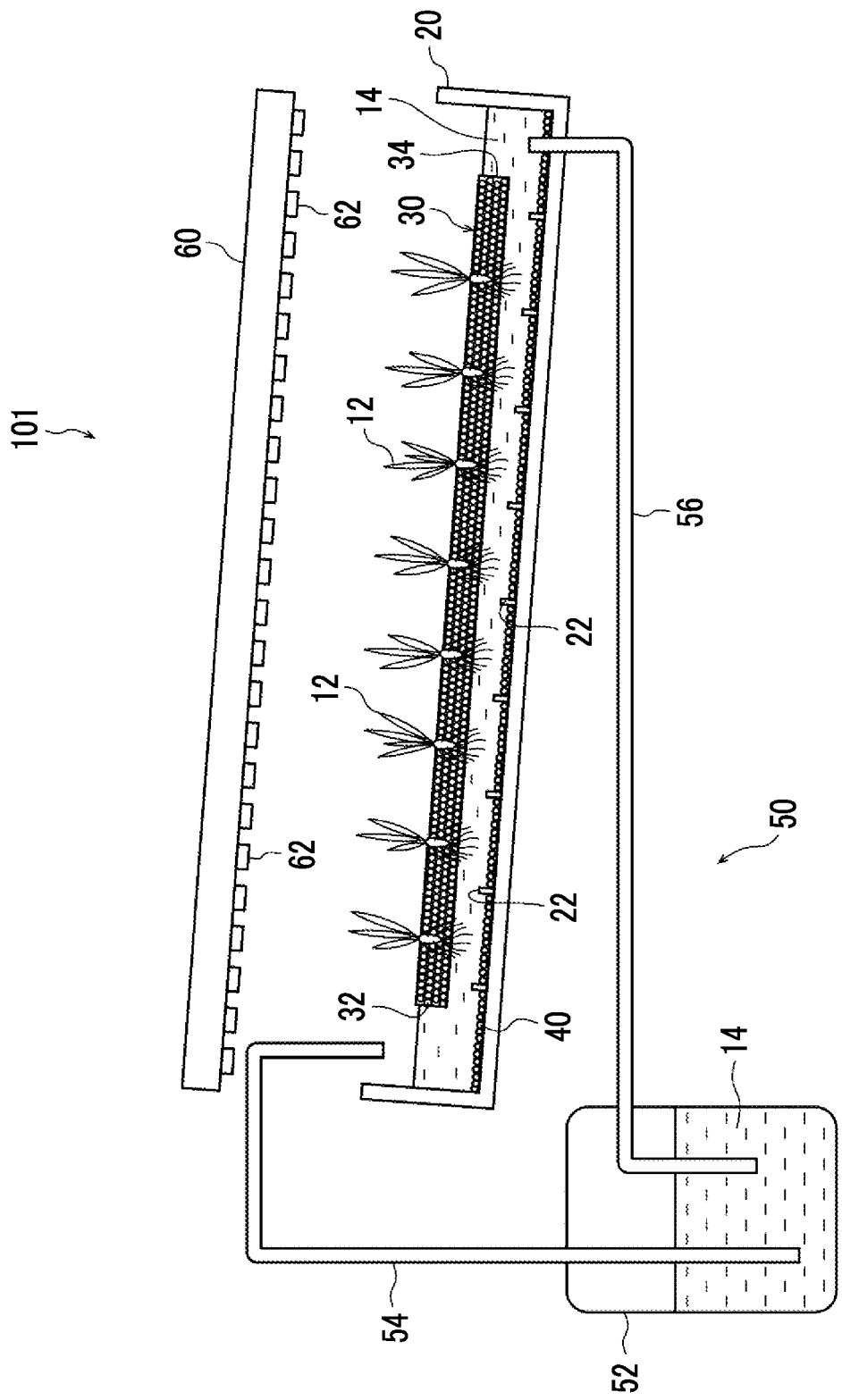
FIG. 1 is a schematic constitution diagram showing an example of a water culture apparatus according to the present embodiment.

Hereinafter, embodiments as an example of the present invention will be described.

In the present specification, in a case where the amount of each component in a composition is mentioned, and there is a plurality of kinds of substances in the composition that correspond to each component, unless otherwise specified, the amount means the total amount of the plurality of kinds of substances present in the composition.

The term "step" includes not only an independent step but also a step which cannot be clearly differentiated from other steps, as long as the intended goal of the step is accomplished.

"XPS" is an abbreviation of X-ray Photoelectron Spectroscopy.

Water Purification Particles/Medium Particles for Water Culture

Water purification particles and medium particles for water culture according to the present embodiment include porous particles and photocatalyst particles supported on the porous particles.

The photocatalyst particles are formed of titanium-based compound particles (hereinafter, referred to as "specific titanium-based compound particles" as well) that have absorption at a wavelength of 500 nm in a visible absorption spectrum, and have an absorption peak at 2,700 $cm^{-1}$ to 3,000 $cm^{-1}$ in an infrared absorption spectrum, in which a metal compound having a metal atom and a hydrocarbon group is bonded to the surface of each of the titanium-based compound particles through an oxygen atom.

"Specific titanium-based compound particles" as the photocatalyst particles have absorption at a wavelength of 500 nm in a visible absorption spectrum, and have an absorption peak at 2,700 cm-1 to 3,000 cm-1 in an infrared absorption spectrum, in which a metal compound having a metal atom and a hydrocarbon group is bonded to the surface of each of the titanium-based compound particles through an oxygen atom. These particles express a photocatalytic function in the range of visible light.

Owing to the above constitution, the water purification particles according to the present embodiment sterilize and purify an aqueous medium while inhibiting the insolubilization of an organic substance or an ion in the aqueous medium.

Owing to the above constitution, the medium particles for water culture according to the present embodiment sterilize and purify a culture solution while inhibiting the inactivation of culture components in the culture solution.

The reason is assumed to be as below.

First, in recent years, due to the aging of people engaged in agriculture and the reduction of the number of people engaged in agriculture, there has been an increasing expectation on a plant factory which can stably produce high-quality and inexpensive plants (for example, foods (vegetables, fruits, and the like) and ornamental plants (flowers and the like)) in a planned way.

The plant factory is roughly classified into "sunlight utilization-type" facilities and "fully controlled" facilities.

"Sunlight utilization-type" facilities use sunlight in a semi-closed environment such as a glass greenhouse or a vinyl greenhouse so as to supplement lighting in rainy days or cloudy days and inhibit temperature increase in summer.

"Fully controlled" facilities use artificial light from a light source such as Light Emitting Diode (LED) in an indoor environment such as a building and are controlled in terms of environmental factors such as temperature and humidity.

In any of the facilities, water culture by which plants grow in a culture solution without using soil is generally performed. By the water culture, plants are cultivated in a culture solution without using soil. Therefore, the water culture less causes a failure resulting from repeated cultivation. Furthermore, in the water culture, temperature and humidity, light, nutrients, carbon dioxide, and the like are controlled. Therefore, the environment optimal for the growth of plants is maintained, and a growth rate is increased.

Accordingly, the water culture has an advantage of being capable of stably harvesting and shipping in a planned way within a short period of time without being influenced by weather.

In the water culture, a culture solution is used. Therefore, in a case where pathogens occur in the culture solution, the pathogens move to plants through the culture solution. Therefore, the interior of facilities, a water culture apparatus, agricultural tools, materials, and the like are washed and sterilized. In addition, restriction on people's entry to the facilities, hand washing, change of clothes, and the like are pursued.

Therefore, the management for keeping the culture solution sterile is complicated, and the management cost tends to increase.

As a method for inhibiting the occurrence of pathogens in the culture solution (that is, a method for sterilizing and purifying the culture solution), there is a method of adding a drug (chlorine agent or the like) to the culture solution or a method of heat-sterilizing the culture apparatus, the agricultural materials, the culture solution, and the like.

However, it is apprehended that the drug (chlorine agent or the like) may damage the root of plants. Furthermore, because the heat sterilization requires huge amounts of energy, the culture costs increase.

As the method for inhibiting the occurrence of pathogens in the culture solution (that is, a method for sterilizing and purifying the culture solution), there are also a method of sterilizing and purifying the culture solution by using a photocatalyst exploiting ultraviolet light or infrared light and a method of sterilizing and purifying the culture solution by using photocatalyst exploiting visible light.

In the sterilization and purification of the culture solution by using a photocatalyst exploiting ultraviolet light or infrared light, due to the strong oxidative action, not only the sterilization and purification but also the insolubilization of organic substances or ions in a liquid is accelerated. As a result, in the water culture, sometimes the culture components (for example, organic substances obtained by the chelation of iron, manganese, copper, zinc, and the like (that is, metal chelate compounds), ions of iron, manganese, copper, and zinc, and the like) in the culture solution are insolubilized and inactivated.

The sterilization and purification of the culture solution using a photocatalyst exploiting visible light are performed using a film containing the photocatalyst. Therefore, it is difficult to sterilize and purify the culture solution. With the low sterilization and purification efficiency of the culture solution, in a case where the culture solution is not circulated, the replacement of culture solution that is a cumbersome operation needs to be performed, and in a case where the culture solution is circulated, a circulation rate of the culture solution needs to be reduced. Therefore, it is difficult for the plants to grow.

As described above, for the sterilization and purification of the culture solution, water culture is required which makes it possible to sterilize and purify the culture solution while inhibiting the inactivation of culture components in the culture solution.

Furthermore, not only for the sterilization and purification of a culture solution, for example, but also for the water purification represented by the purification of water in a pond of a garden, water in a water tank or in an aqua terrarium, laundry water, hot spring water, and the like, water purification is required which sterilizes and purifies an aqueous medium while inhibiting the insolubilization of an organic substance or an ion in the aqueous medium.

The water purification particles and the medium particles for water culture according to the present embodiment are constituted with porous particles supporting "specific titanium-based compound particles" as photocatalyst particles.

Each of "specific titanium-based compound particles" as photocatalyst particles has a structure in which a metal compound having a metal atom and a hydrocarbon group is bonded to the surface of each of the titanium-based compound particles through an oxygen atom, and has a high specific surface area. Therefore, these particles exhibit high adsorptivity to germs. Furthermore, these particles are hardly aggregated and exhibit high dispersibility.

The specific titanium-based compound particles have absorption at a wavelength of 500 nm in a visible absorption spectrum and perform a high photocatalytic function in the range of visible light. The wavelength range around a wavelength of 500 nm in a visible absorption spectrum is the wavelength range of reflected light from leaves of plants and the like (specifically, green reflected light). Therefore, the specific titanium-based compound particles express a photocatalytic function by exploiting the reflected light from the leaves of plants and the like.

The photocatalyst particles, which have the dispersibility and the absorptivity described above and exhibit a high photocatalytic function in the range of visible light, are supported on the porous particles substantially in a uniform state, and express high germ adsorptivity and a high photocatalytic function in the range of visible light.

However, the oxidative action of "specific titanium-based compound particles" as photocatalyst particles is milder than the oxidative action of a photocatalyst exploiting ultraviolet light or infrared light. Therefore, while the sterilization and purification are promoted, the insolubilization of an organic substance or an ion in the aqueous medium is inhibited.

Presumably, owing to the above constitution, the water purification particles according to the present embodiment may sterilize and purify an aqueous medium while inhibiting the insolubilization of an organic substance or an ion in the aqueous medium.

Presumably, owing to the above constitution, the medium particles for water culture according to the present embodiment may sterilize and purify a culture solution while inhibiting the inactivation of culture components in the culture solution.

In order to sterilize and purify the aqueous medium by using a photocatalyst exploiting ultraviolet light or infrared light, expensive facilities and large facilities are required.

In contrast, in the sterilization and purification of the aqueous medium by using the water purification particles according to the present embodiment, the sterilization and purification can be performed using sunlight as well as reflected light from an object (for example, reflected light from leaves of plants and the like) including visible light. That is, even though the aqueous medium is sterilized and purified in an indoor environment such as a building, it is possible to use a light source such as a general-purpose LED radiating light of a visible range. Therefore, the sterilization and purification of an aqueous medium by using the water purification particles according to the present embodiment is advantageous in terms of cost reduction of facilities and downsizing of facilities.

That is, a water purification apparatus including the water purification particles according to the present embodiment sterilizes and purifies an aqueous medium while inhibiting insolubilization of an organic substance or an ion in the aqueous medium. In addition, the cost reduction of facilities and the downsizing of facilities can be achieved.

In addition, the water culture apparatus including at least either the water purification particles or the medium particles for water culture according to the present embodiment sterilizes and purifies of a culture solution while inhibiting the inactivation of culture components in the culture solution.

Accordingly, even though the culture solution is not circulated, the number of times the culture solution is replaced is reduced, and even though the culture solution is circulated, by increasing the circulation rate of the culture solution, plants grow. In addition, the culture solution is sterilized and purified using a photocatalyst which exploits visible light having weaker oxidative action compared to a photocatalyst exploiting ultraviolet light or infrared light. Therefore, the damage of the root of the plants is inhibited. This point also favors the growth of plants.

Therefore, the cost and the size of the water culture apparatus, which includes at least either the water purification particles or the medium particles for water culture according to the present embodiment, are reduced.

Hereinafter, the present embodiment will be specifically described with reference to drawings. In some cases, the members substantially having the same function are marked with the same references throughout all the drawings so as to avoid the redundancy of description.

Hereinafter, a water culture apparatus will be described which corresponds to both the aspect including the water purification particles according to the present embodiment and aspect having the medium particles for water culture in a medium member. Here, the water culture apparatus according to the present embodiment may be an apparatus corresponding to any of the aspects.

Water Culture Apparatus

As shown in FIG. 1, a water culture apparatus 101 according to the present embodiment includes, for example, a container 20 holding a culture solution containing nutrients for a plant 12, a medium member 30 for the growth of the plant 12, water purification particles 40 disposed in a position where the particles contact a culture solution 14 and are exposed to visible light, a circulation device 50 circulating the culture solution held in the container 20, and a light irradiation device 60 irradiating at least the water purification particles 40 and the medium member 30 with visible light.

The water culture apparatus 101 is, for example, a Nutrient Film Technique-type water culture apparatus (that is, an NFT-type water culture apparatus). The water culture apparatus 101 may also be a Deep Flow Technique-type water culture apparatus (that is, a DFT-type water culture apparatus).

An apparatus including the container 20, the medium member 30, the water purification particles 40, the circulation device 50, and the light irradiation device 60 in the water culture apparatus 101 corresponds to an example of a water purification apparatus.

Here, the circulation device 50 and the light irradiation device 60 are devices that are provided as necessary.

Culture Solution

Examples of the culture solution include an aqueous solution containing nutrients for the plant 12. Examples of the nutrients for the plant 12 include nutrients containing nitrogen, phosphorus, potassium, calcium, magnesium, sulfur, boron, iron, manganese, zinc, molybdenum, and the like. The nutrients for the plant 12 include inorganic nutrients and organic nutrients containing the elements described above.

The composition of the nutrients for the plant 12 in the culture solution is selected according to the plant 12 to grow and the growing condition of the plant 12.

Examples of the inorganic nutrients include known nutrients such as potassium nitrate, calcium nitrate, sodium nitrate, urea, ammonium sulfate, ammonium chloride, ammonium phosphate, potassium phosphate, potassium chloride, potassium sulfate, calcium phosphate, calcium chloride, magnesium sulfate, ferrous sulfate, iron (ii) sulfide, boric acid, sodium borate, manganese sulfate, manganese chloride, zinc sulfate, zinc chloride, copper sulfate, ammonium molybdate, and sodium molybdate.

Examples of the organic nutrients include known nutrients such as organic substances (that is, metal chelate compounds) obtained by chelating iron, manganese, copper, zinc, and the like. Examples of chelating agents include ethylenediaminetetraacetic acid (EDTA), diethylenetriamine-N,N,N',N'',N'',-pentaacetic acid (DTPA), and ethylenediamine-di(o-hydroxyphenylacetic acid) (EDDHA).

Particularly, the water culture apparatus 101 inhibits the insolubilization of nutritional components in the culture solution and inhibits the inactivation of nutrients. Therefore, even though the culture solution particularly contains nutrients (for example, organic nutrients obtained by chelating iron, manganese, copper, zinc, and the like (that is, metal chelate compounds) and inorganic nutrients including iron, manganese, copper, zinc, and the like) that are easily insolubilized by the action of a photocatalyst exploiting ultraviolet light or infrared light, the water culture apparatus 101 has an advantage of inhibiting the insolubilization of these nutrients.

Container

Container 20

In the water culture apparatus 101, the container 20 is, for example, a tank in the form of an open-top box.

The bottom portion of the container 20 is connected to a discharge pipe 56 of a circulation device 50. The discharge pipe 56 of the circulation device 50 may be connected to a lateral wall portion of the container 20.

The bottom portion of the container 20 is provided, for example, with plate-like compartment members 22 that compart the water purification particles 40. In a case where the container is provided with the compartment members 22, even though the bottom portion of the container 20 is tilted away from the horizontal direction, the water purification particles 40 are inhibited from converging on one site.

As a result, the sterilization and purification properties of the culture solution are improved.

The container 20 is constituted, for example, with one tank. The container 20 may be constituted with a plurality of tanks.

Medium Member

Figure 2:
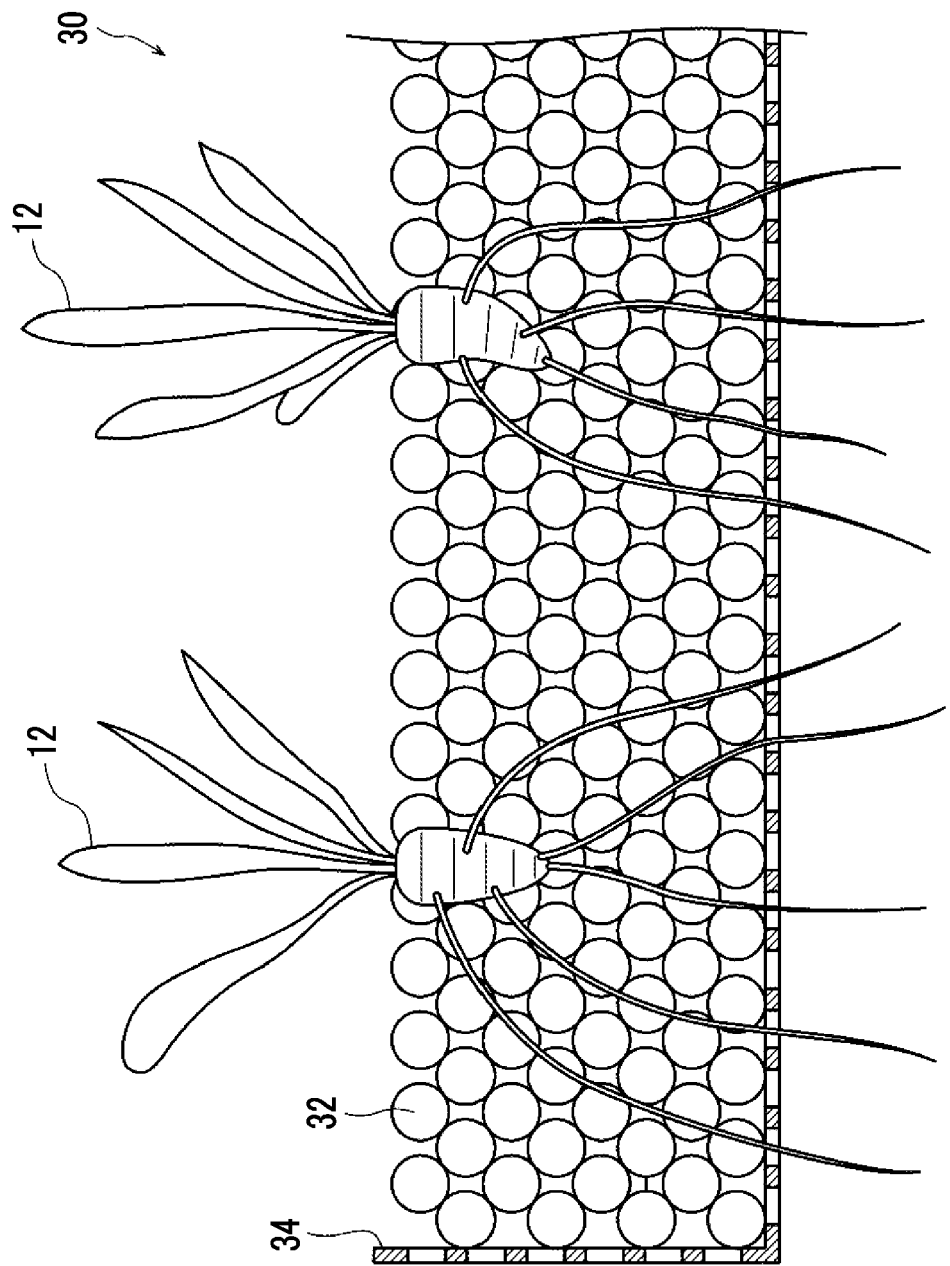
FIG. 2 is a schematic constitution diagram showing an example of a medium member in the water culture apparatus according to the present embodiment.

The medium member 30 is constituted, for example, with medium particles for water culture 32 holding the root of the plant 12 to grow and an accommodation portion 34 accommodating the medium particles for water culture 32 (see FIG. 2). Here, the medium particles for water culture 32 of the medium member 30 may be members which hold the entirety or a portion of the root of the plant 12.

For example, in a state where the medium particles for water culture 32 of the medium member 30 are accommodated in the accommodation portion 34, some of the medium particles for water culture 32 are immersed in the culture solution 14 together with the root of the plant 12.

Here, as long as the medium particles for water culture 32 of the medium member 30 are disposed such that the entirety or some of the particles contact the culture solution 14, the way the particles 32 are immersed in the culture solution 14 is not particularly limited, and the entirety of the medium particles for water culture 32 of the medium member 30 may be immersed in the culture solution 14.

The medium member 30 may have medium particles other than the medium particles for water culture 32. Here, it is better that the content of the medium particles for water culture 32 with respect to the total content of medium particles is 30% by number (for example, preferably equal to or greater than 50% by number, more preferably equal to or greater than 75% by number, and even more preferably equal to or greater than 90% by number).

The accommodation portion 34 of the medium member 30 is constituted, for example, with one member in the form of an open-top box. For example, the accommodation portion 34 has a plurality of holes that are provided in a portion of the bottom portion and the lateral wall portion to be immersed in the culture solution 14 so as to allow the culture solution 14 to enter the interior of the accommodation portion 34. Examples of the accommodation portion 34 include a member constituted with a mesh-like substance formed of metal wires or resin wires alternately arranged, a mesh-like substance formed of metal straps or resin straps alternately arranged, or a mesh-like substance obtained by processing a metal plate or a resin plate into a mesh.

The plurality of holes have a size that prevents the medium particles for water culture 32 from leaking through the holes. In a state where the culture solution 14 has entered the interior of the accommodation portion 34 through the plurality of holes and at least the medium particles for water culture 32 are accommodated in the accommodation portion 34, the entirety or some of the medium particles for water culture 32 are brought into contact with the culture solution 14.

For example, the accommodation portion 34 of the medium member 30 may be constituted such that the root of the plant 12 grows to the outside of the accommodation portion 34 from the bottom portion of the accommodation portion 34 through the plurality of holes.

The medium member 30 may have a plurality of accommodation portions 34.

The medium member 30 is not particularly limited as long as the medium member 30 has a constitution in which the medium particles for water culture 32 are disposed in a position where the particles contact the culture solution 14 and are exposed to visible light.

Figure 3:
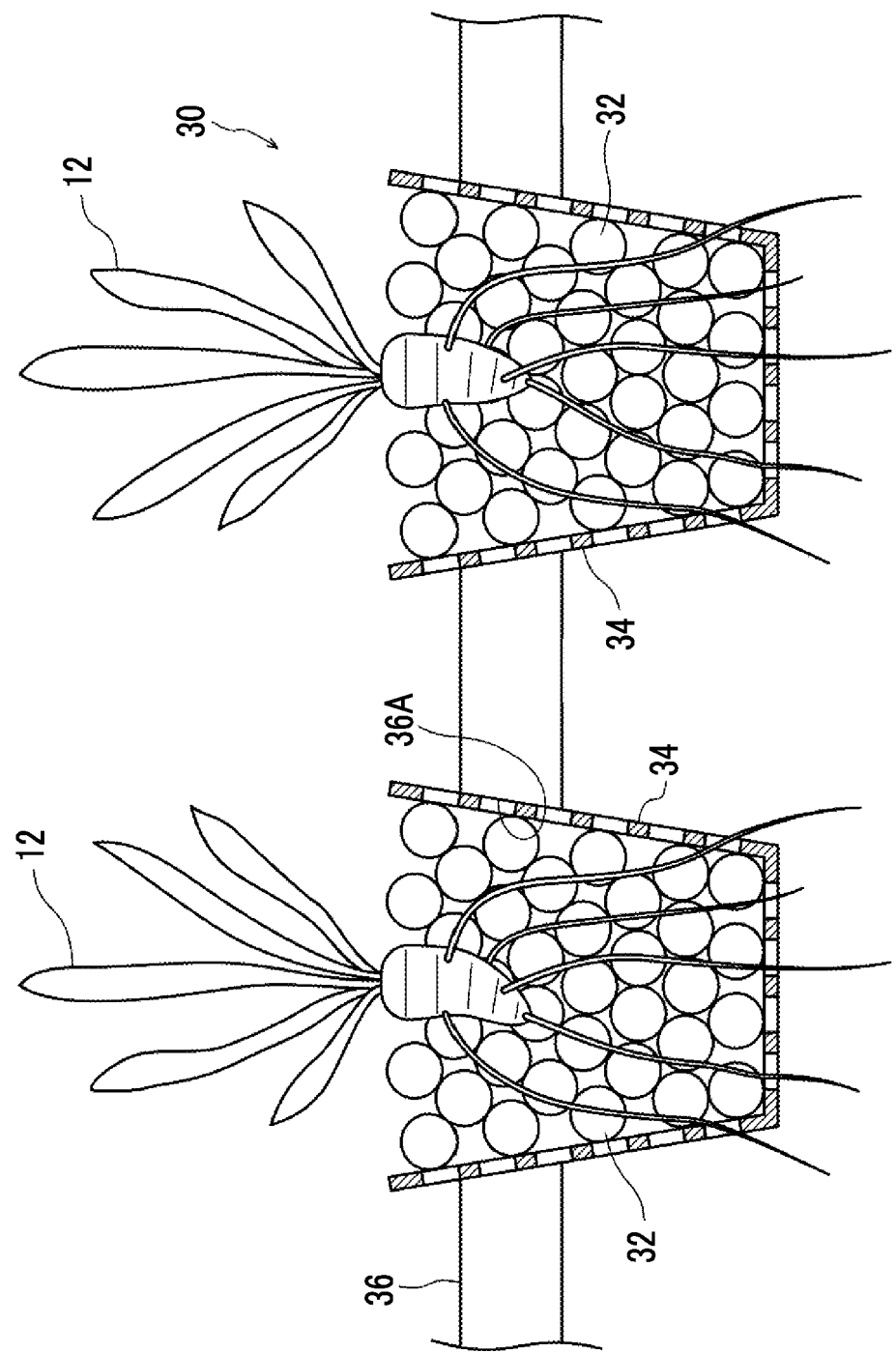
FIG. 3 is a schematic constitution diagram showing another example of the medium member in the water culture apparatus according to the present embodiment.

For example, the medium member 30 may include an aspect having the medium particles for water culture 32, a plurality of accommodation portions 34 (for example, cup-like accommodation portions 34), and a supporting portion 36 supporting the plurality of accommodation portions 34 (see FIG. 3).

For example, the supporting portion 36 is constituted as a flat plate-like substance having opening portions 36A for supporting the plurality of accommodation portions 34 by allowing the accommodation portions 34 to be inserted into the opening portions 36A. Here, the constitution of the supporting portion 36 is not particularly limited as long as the supporting portion 36 can support the plurality of accommodation portions 34. For example, the supporting portion 36 may be a structure formed of metal wires or resin wires that are bent, curved, or joined together, a structure formed of metal straps or resin straps that are bent, curved, or joined together, or the like.

The medium member 30 has, for example, visible light-transmitting properties.

Particularly, in the container 20, in a case where the entirety or some of the water purification particles 40 are disposed in a position overlapping the medium member 30 in a case where the particles are seen in the depth direction of the container 20, it is better for the medium member 30 to have visible light-transmitting properties. This is because the visible light also reaches the portion of the water purification particles 40 overlapping the medium member 30 through the medium member 30. In a case where the medium member 30 has the visible light-transmitting properties, the culture solution is easily sterilized and purified.

Specifically, a visible light transmittance of the medium member 30 is, for example, preferably equal to or higher than 30%, more preferably equal to or higher than 30% and equal to or lower than 95%, and even more preferably equal to or higher than 50% and equal to or lower than 90%.

The visible light transmittance of the medium member 30 is measured as below. Based on JIS K7361-1:1997, a total light transmittance (%) is measured using a haze meter (NDH-2000 manufactured by NIPPON DENSHOKU INDUSTRIES Co., LTD).

Here, in a case where the entirety or some of the water purification particles 40 are disposed in a position that does not overlap the medium member 30 in a case where the particles are seen in the depth direction of the container 20, it is better for the medium member 30 not to have visible light-transmitting properties.

Other details of the medium particles for water culture 32 will be described later.

Water Purification Particles 40

The water purification particles 40 are disposed on the entire surface of the bottom portion of the container 20, in a state of being immersed in the culture solution 14 in the container 20. That is, some of the water purification particles 40 are disposed in a position that does not overlap the medium member 30 in a case where the particles are seen in the depth direction of the container 20.

The water purification particles 40 are disposed, for example, as a single layer on the entire surface of the bottom portion of the container 20. Here, as long as the visible light reaches the water purification particles 40 as a lower layer, the water purification particles 40 may be disposed as stacked layers.

As long as the water purification particles 40 are disposed in a position where the particles contact the culture solution 14 and are exposed to visible light, the aspect of the disposition of the water purification particles 40 is not particularly limited. For example, the following aspect may also be adopted.

1) Aspect of disposing entirety of water purification particles 40 in position that does not overlap medium member 30 in a case where the particles are seen in depth direction of container 20

2) Aspect of disposing entirety of water purification particles 40 in position overlapping medium member 30 when seen in depth direction of container 20 in a case where the particles are seen in the depth direction of the container 20 (in this aspect, for example, a visible light-transmitting member is used as the medium member 30, a light irradiation device irradiating the water purification particles 40 with visible light is provided, and the like.)

3) Aspect of disposing water purification particles 40 around medium member 30 by floating water purification particles 40 on culture solution 14

4) Aspect of disposing water purification particles 40 by bringing the water purification particles 40 into contact with culture solution 14 in storage tank 52 of circulation device 50 (in this aspect, for example, a visible light-transmitting tank is used as the storage tank 52, a light irradiation device irradiating the water purification particles 40 in the storage tank 52 with visible light is provided, and the like.)

Other details of the water purification particles 40 will be described later.

Circulation Device

The circulation device 50 has, for example, a storage tank 52 storing the culture solution 14, a supply pipe 54 supplying the culture solution 14 in the storage tank 52 to the container 20, and the discharge pipe 56 discharging the culture solution 14 in the container 20 to the storage tank 52.

For example, one end of the supply pipe 54 is connected to the storage tank 52, and the other end thereof is disposed in a position where the culture solution 14 can be supplied to the container 20 (for example, the position above one end portion of the container 20). In the middle of the route of the supply pipe 54, for example, a pump and a valve are disposed although these are not shown in the drawing.

For example, one end of the discharge pipe 56 is connected to the storage tank 52, and the other end thereof is disposed in a position where the culture solution 14 in the container 20 can be discharged (for example, the bottom portion or the lateral wall portion of the container 20 that is on the side opposite to the position in which the other end of the supply pipe 54 is disposed). In the middle of the route of the discharge pipe 56, for example, a pump and a valve are disposed although these are not shown in the drawing.

From the viewpoint of sterilizing and purifying the culture solution, a calculative flow rate of the culture solution 14 flowing through the water purification particles 40 or the medium particles for water culture 32 that is calculated from an amount of the culture solution 14 supplied to the container 20 per unit time by the circulation device 50 (L/min (Liter/minute)) and a volume of the water purification particles 40 or the medium particles for water culture 32 ($m^3$) is, for example, preferably equal to or higher than 9 (L/min/$m^3$) and equal to or lower than 30,000 (L/min/$m^3$), more preferably equal to or higher than 25 (L/min/$m^3$) and equal to or lower than 5,500 (L/min/$m^3$), and even more preferably equal to or higher than 400 (L/min/$m^3$) and equal to or lower than 3,000 (L/min/$m^3$).

The calculative flow rate of the culture solution 14 flowing through the water purification particles 40 or the medium particles for water culture 32 is calculated as below.

Flow rate of culture solution flowing through water purification member or medium particles for water culture (L/min/$m^3$)=amount of culture solution supplied per unit time (L/min)/volume of water purification member or medium particles for water culture ($m^3$)

The circulation device 50 is not particularly limited as long as it is a device circulating the culture solution 14 held in the container 20. For example, the circulation device 50 may be a known device adopting a method in which one of the supply and discharge of the culture solution 14 in the container 20 is performed by gravity flow and the other is performed using a liquid supply machine such as a pump.

Light Irradiation Device

The light irradiation device 60 is, for example, a device irradiating the plant 12 to grow, the water purification particles 40, and the medium particles for water culture 32 with visible light (for example, a device in which a portion radiating light is disposed in a position above the container 20).

The light irradiation device 60 may be a device irradiating at least the water purification particles 40 and the medium particles for water culture 32 with visible light. In a case where the water culture apparatus 101 is installed in an indoor environment to which sunlight does not reach or does not easily reach, the light irradiation device 60 may be a device irradiating the plant 12, the water purification particles 40, and the medium particles for water culture 32 with visible light.

The light irradiation device 60 has the light source 62 emitting visible light. Examples of the light source 62 include a Light Emitting Diode (LED) unit, a laser unit, a fluorescent lamp, and the like.

In a case where only the water purification particles 40 and the medium particles for water culture 32 are irradiated with visible light, the light source 62 may be a light source radiating visible light in a wavelength range including "wavelength of 500 nm in a visible absorption spectrum" absorbed by at least the photocatalyst particles (titanium-based compound particles) of the water purification particles 40 and the medium particles for water culture 32.

In contrast, in a case where the plant 12 is also irradiated with visible light in addition to the water purification particles 40 and the medium particles for water culture 32, the light source 62 may be a light source radiating visible light in a wavelength range including the entire range of visible light (for example, a wavelength in a range equal to or longer than 360 nm and equal to or shorter than 830 nm).

The light irradiation device 60 is not particularly limited as long as it is a device irradiating at least the water purification particles 40 and the medium particles for water culture 32 with visible light. The light irradiation device 60 may be a known device such as a device which irradiates the water purification particles 40 with the visible light emitted from the light source 62 through a reflection plate or a light guiding path (optical fiber or the like) or a device which causes diffused reflection of the visible light emitted from the light source 62 and then irradiates the water purification particles 40 with the light.

The water culture apparatus 101 according to the present embodiment described above includes the water purification particles 40 and the medium particles for water culture 32. Therefore, the apparatus sterilizes and purifies the culture solution while inhibiting the inactivation of culture components in the culture solution.

The water culture apparatus 101 according to the present embodiment is not limited to the above constitution, and various known water culture apparatuses may be applied thereto. For example, an apparatus adopting the following method may be applied to the water culture apparatus 101 according to the present embodiment.

1) Apparatus adopting method in which the culture solution 14 is not circulated.

2) Apparatus adopting method in which concentrated solution of culture solution 14 is supplied to culture solution 14 in storage tank 52 of container 20 or circulation device.

3) Apparatus adopting method in which oxygen is supplied to culture solution 14 in container 20 or storage tank 52 of circulation device.

The water purification apparatus included in the water culture apparatus 101 according to the present embodiment (for example, an apparatus including the container 20, the medium member 30, the water purification particles 40, the circulation device 50, and the light irradiation device 60) may be applied to apparatuses other than the water culture apparatus 101.

For example, the water purification apparatus can be applied to apparatuses purifying water in a pond of a garden, apparatuses sterilizing water in a water tank or an aqua terrarium, laundry water, hot spring water, and the like.

The water purification apparatus includes the water purification particles 40. Therefore, the water purification apparatus can sterilize and purify an aqueous medium while inhibiting the insolubilization of an organic substance or an ion in the aqueous medium.

Water Purification Particles

Hereinafter, the water purification particles and the medium particles for water culture applied to the water culture apparatus and the water purification apparatus according to the present embodiment will be specifically described.

In the following description, the water purification particles and the medium particles for water culture will be referred to as catalyst-supporting porous particles according to the present embodiment.

The catalyst-supporting porous particles according to the present embodiment include porous particles and photocatalyst particles supported on the porous particles.

Porous Particles

The porous particles are objects on which the photocatalyst particles are supported. It is better for the porous particles to have liquid permeability.

The porous particles (at least the surface of the porous particles) may be hydrophilic or hydrophobic. From the viewpoint of improving the affinity with an aqueous medium (for example, a culture solution) to be purified and making it easy to sterilize and purify the aqueous medium (for example, making it easy to sterilize and purify the culture solution), although there is no particular limitation, it is preferable that the porous particles are hydrophilic.

Hydrophilicity means properties of easily absorbing water and easily wet with water. A degree of hydrophilicity can be represented by a contact angle with respect to water (hereinafter, simply referred to as "water contact angle" in some cases).

In a case where an object is hydrophilic, a contact angle of the surface of the object with respect to water is, for example, preferably equal to or smaller than 90°, more preferably equal to or smaller than 60°, and most preferably equal to or smaller than 30°. In a case where water is added dropwise to the surface of an object to be measured, an angle is formed between the surface and the surface of water. The aforementioned water contact angle means the angle formed as above. The larger the water contact angle, the more difficult it is for the object to be wet with water, and the smaller the water contact angle, the easier it is for the object to be wet with water.

The water contact angle is measured using a goniometer or the like. Specifically, in an environment of 23° C. and 55% RH, water is added dropwise to the surface of an object. At this time, after the object is left as it is for 60 seconds, the contact angle is measured using a contact angle meter CA-X (manufactured by Kyowa Interface Science Co., LTD.).

In the measurement of the water contact angle, a sample formed by performing compression molding on the porous particles to be measured is used as a measurement object.

The average pore size of the porous particles is within a range equal to or greater than 0.5 μm and equal to or smaller than 100 μm. For example, the average pore size is larger than the particle diameter of the photocatalyst particles.

Specifically, the average pore size of the porous particles is, for example, preferably equal to or greater than 1 μm and equal to or smaller than 50 μm, and more preferably equal to or greater than 1.5 μm and equal to or smaller than 30 μm.

The average pore size of the porous particles is measured as below.

The porous particles are observed and imaged using a scanning electron microscope (manufactured by Hitachi, LTD., S-4100). At this time, the porous particles are imaged by adjusting the magnification such that a plurality of pores of the porous particles can be observed by the scanning electron microscope, and the average pore size is measured.

For example, in a case where the porous particles are constituted with a metal, glass, ceramics, and the like, the pores are elliptical or amorphous. Accordingly, the major axis (that is, the longest diameter) of the pores is adopted as a pore size.

In addition, for example, in a case where the porous particles are constituted with fibrous materials such as paper, non-woven cloth, and cloth, the major axis (that is, the longest diameter) of a hole formed by the interweaving and stacking of fibers is adopted as a pore size.

The pore size is measured as above for 10 to 50 pores, and the average thereof is adopted as the average pore size.

Examples of porous particles include particles constituted with fiber, porous resin particles, porous metal particles, porous glass particles, porous ceramic particles, and the like.

Examples of the fiber include natural fiber (cotton, silk, linen, wool, pulp, or the like) and synthetic fiber (nylon fiber, polyester fiber, acryl fiber, polyurethane fiber, polyolefin fiber, cellulose fiber, vinyl alcohol fiber, or the like).

Among these, although there is no particular limitation, fiber to which photocatalyst particles easily adhere is preferable. Specifically, although there is no particular limitation, polyolefin fiber (polyethylene fiber, polypropylene fiber, or the like), polyester fiber (polyester terephthalate fiber or the like), cellulose fiber (cellulose triacetate fiber, cellulose diacetate fiber, or the like), and polyvinyl alcohol fiber (ethylene-vinyl alcohol fiber or the like) are preferable.

As the fiber to which photocatalyst particles easily adhere, there is also core-sheath type composition fiber having a core portion and a sheath portion surrounding the core portion. It is better for the core portion to be constituted with a hydrophobic resin having a high melting point (a polypropylene resin, a polyester resin, a cellulose resin, or the like).

It is better for the sheath portion to be constituted with a hydrophilic resin having a low melting point (melting point lower than that of the resin of the core portion) (a polyethylene resin, a polyvinyl alcohol resin (ethylene-vinyl alcohol copolymer resin), or the like).

Examples of the porous resin particles include porous particles of a polyamide resin, a polyimide resin, a polyacrylic acid resin, a polymethacrylic acid resin, a polystyrene resin, a fluororesin, a silicone resin, and the like.

Examples of the porous glass substance include porous glass substances obtained by sintering spherical quartz glass powder.

Examples of the porous metal particles include porous metal particles obtained by sintering a metal or an alloy such as SUS, aluminum, or nickel.

Examples of the porous ceramic particles and the like include porous ceramic particles obtained by sintering ceramics such as alumina or zirconia.

Among these, from the viewpoint of sterilizing and purifying the aqueous medium (for example, from the viewpoint of sterilizing and purifying the culture solution), as the porous particles, although there is no particular limitation, the particles constituted with fiber (hereinafter, referred to as "porous particles made of fiber" as well) are preferable.

From the viewpoint of liquid permeability, flexibility, rigidity, photocatalyst particle holding properties, and the like, the average diameter of the fiber (that is, the average fiber diameter) constituting the porous particles made of fiber is, for example, preferably equal to or greater than 0.5 μm and equal to or smaller than 100 μm, and more preferably equal to or greater than 1 μm and equal to or smaller than 50 μm.

From the viewpoint of liquid permeability, flexibility, rigidity, photocatalyst particle holding properties, and the like, the average length of the fiber (that is, the average fiber length) constituting the porous particles made of fiber is, for example, preferably equal to or greater than 0.5 mm and equal to or smaller than 200 mm, and more preferably equal to or greater than 1 mm and equal to or smaller than 100 mm.

The average fiber diameter and the average fiber length of the fiber constituting the porous substance is an arithmetic mean of fiber diameters (here, the fiber diameter is the longest diameter) and fiber lengths of 20 strands of fiber measured through electron microscopy.

From the viewpoint of liquid permeability, flexibility, rigidity, photocatalyst particle holding properties, and the like, the average particle diameter of the porous particles is, for example, preferably equal to or greater than 0.5 mm and equal to or smaller than 20 mm, more preferably equal to or greater than 1 mm and equal to or smaller than 15 mm, and even more preferably equal to or greater than 2 mm and equal to or smaller than 10 mm.

From the same viewpoint as that described above, a ratio of average particle diameter between the photocatalyst particles and the porous particles (photocatalyst particles/porous particles) is, for example, preferably equal to or higher than 0.00000005 and equal to or lower than 0.0004, more preferably equal to or higher than 0.00000007 and equal to or lower than 0.00002, and even more preferably equal to or higher than 0.0000001 and equal to or lower than 0.00001.

The average particle diameter of the porous particles is the average particle diameter of primary particles (average primary particle diameter) and measured as below.

The photocatalyst particles supported on the porous particles are removed by an ultrasonic treatment or the like. Here, the photocatalyst particles do not need to be totally removed.

The porous particles from which the photocatalyst particles have been removed are observed and imaged using an optical microscope (manufactured by KEYENCE CORPORATION, digital microscope VHX-5000). For about 10 to 50 primary particles, the diameter (longest diameter) of each of the particles is measured and analyzed, thereby determining the average primary particle diameter.

Photocatalyst Particles

Figure 4:
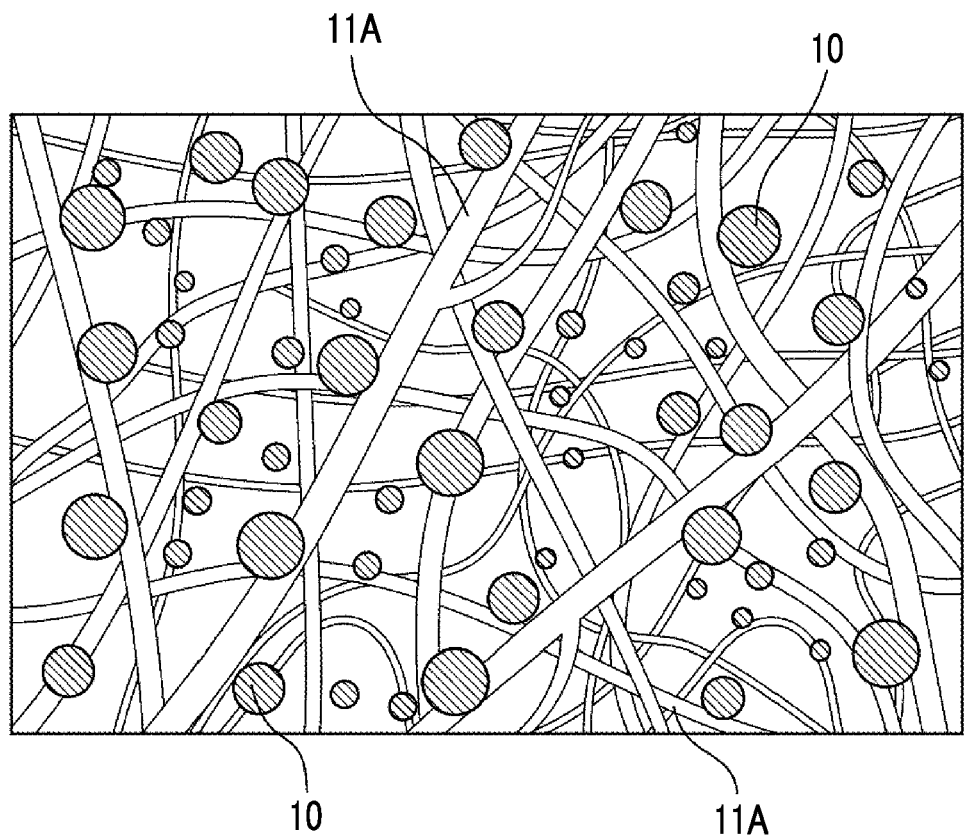
FIG. 4 is a schematic enlarged diagram showing an example of an attachment state of photocatalyst particles in water purification particles according to the present embodiment.

The photocatalyst particles are in the water purification particles in a state of being supported on the inner wall of the pores of the porous particles (in a case where the porous particles are constituted with fiber, the photocatalyst particles are supported on the fiber) (see FIG. 4).

Figure 5:
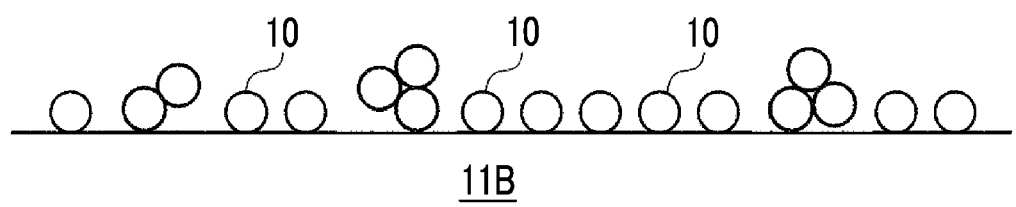
FIG. 5 is a schematic constitution diagram for illustrating the attachment state of the photocatalyst particles in the water purification particles according to the present embodiment.

For example, in a case where the photocatalyst particles are metatitanic acid particles or titanium oxide particles, the photocatalyst particles are in the water purification particles 40 in a state of primary particles or in a state of aggregated particles formed by the aggregation of the primary particles (see FIG. 5).

Figure 6:
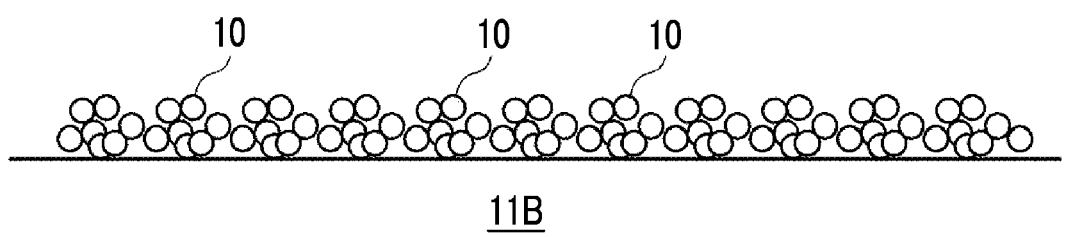
FIG. 6 is a schematic constitution diagram for illustrating the attachment state of the photocatalyst particles in the water purification particles according to the present embodiment.

In addition, for example, in a case where the photocatalyst particles are titanium oxide aerogel particles and silica-titania composite aerogel particles, the photocatalyst particles are in the water purification particles 40 as an aggregate having an aerogel structure (see FIG. 6). "Aerogel structure" refers to a structure in which the primary particles are aggregated while forming a porous structure. The aerogel structure has a cluster structure formed by the clustering of granular materials having a nanometer-order diameter, and the interior thereof looks like a three-dimensional network-shaped microstructure.

FIG. 4 to FIG. 6 show aspects in which the photocatalyst particles are supported on the porous particles. Here, FIG. 4 shows an aspect in which the photocatalyst particles are supported on the porous particles made of fiber as porous particles.

In FIG. 4 to FIG. 6, 10 represent a photocatalyst particle, 11A represents fiber of the porous particles made of fiber, and 11B represents the inner wall of the pore of the porous particles (in a case where the porous particles are porous particles made of fiber, 11B represents the fiber).

Hereinafter, the photocatalyst particles will be specifically described. In the following description, references will not be mentioned.

The photocatalyst particles have absorption at a wavelength of 500 nm in a visible absorption spectrum, and have an absorption peak at 2,700 $cm^{-1}$ to 3,000 $cm^{-1}$ in an infrared absorption spectrum. Accordingly, the photocatalyst particles exhibit a high catalytic function by visible light.

Specifically, each of the photocatalyst particles is a titanium-based compound particle in which a metal compound having a metal atom and a hydrocarbon group is bonded to the surface of each of the titanium-based compound particles through an oxygen atom.

The particles, in which the metal compound having a metal atom and a hydrocarbon group is bonded to the surface of each of the particles through an oxygen atom, are obtained, for example, by performing a surface treatment on untreated particles (for example, metatitanic acid particles, titanium oxide particles, titanium oxide aerogel particles, and silica-titania composite aerogel particles that are untreated) by using a metal compound having a hydrocarbon group and then oxidating at least a portion of the hydrocarbon group by a heating treatment such that the hydrocarbon group is changed to a C—O bond or a C=O bond. Presumably, because a structure, in which an organic metal compound containing appropriately oxidized carbon atoms, oxygen atoms, and titanium atoms (or silicon atoms) are connected to each other in this order through a covalent bond, is on the surface of the particles, the surface of the particles may exhibit absorptivity at a wavelength of 500 nm, and the particles may express a photocatalytic function by visible light (responsiveness to visible light), although the detailed mechanism thereof is unclear.

Hereinafter, the metal compound having a metal atom and a hydrocarbon group will be simply referred to as "organic metal compound" as well.

The photocatalyst particles also have the following advantages in addition to expressing a high photocatalytic function even in the range of visible light.

Generally, untreated particles (for example, metatitanic acid particles, titanium oxide particles, titanium oxide aerogel particles, and silica-titania composite aerogel particles that are untreated) have high hydrophilicity and are very easily aggregated. Therefore, these particles tend to exhibit poor dispersibility and adhesiveness with respect to the porous particles.

However, in a case where the photocatalyst particles have a hydrocarbon group derived from the organic metal compound on the surface thereof, the hydrophobicity thereof is enhanced, and the dispersibility and the adhesiveness thereof with respect to the porous particles are improved. Consequently, the photocatalyst particles are supported on the surface of the porous particles substantially in a uniform state.

Furthermore, the photocatalyst particles are hardly detached from the porous particles.

Untreated Particles

Examples of the particles (untreated particles) to be subjected to a surface treatment using an organic metal compound include untreated titanium-based compound particles.

Examples of the untreated titanium-based compound particles include untreated particles such as metatitanic acid particles, titanium oxide particles, titanium oxide aerogel particles, and silica-titania composite aerogel particles. Among these, from the viewpoint of improving the adhesiveness with respect to the porous substance, although there is no particular limitation, untreated metatitanic acid particles are preferable.

That is, as the photocatalyst particles, although there is no particular limitation, at least one kind of particles selected from the group consisting of metatitanic acid particles, titanium oxide particles, titanium oxide aerogel particles, and silica-titanium composite aerogel particles are preferable. Although there is no particular limitation, metatinic acid particles are preferable.

In a case where the photocatalyst particles are caused to adhere to the surface of the porous particles as an aggregate having an aerogel structure, as the untreated titanium-based compound particles, for example, at least one kind of particles between the untreated titanium oxide aerogel particles and the silica-titania composite aerogel particles are preferably used.

Untreated Metatitanic Acid Particles

The untreated metatitanic acid particles refer to particles of titanic acid as one of the titanic acid hydrates represented by $TiO_2.nH_2O$ in which n=1.

The method for preparing the untreated metatitanic acid particles is not particularly limited, and examples thereof include a chlorine method (gas phase method) and a sulfuric acid method (liquid phase method). Between these, although there is no particular limitation, the sulfuric acid method (liquid phase method) is preferable.

For example, the sulfuric acid method (liquid phase method) is as below. First, as a raw material, ilmenite ore ($FeTiO_3$) or tungsten is dissolved in concentrated sulfuric acid, and an iron component, which is an impurity, is isolated as iron sulfate ($FeSO_4$), thereby preparing titanium oxysulfate ($TiOSO_4$) (titanyl sulfate solution). Then, by hydrolyzing the titanium oxysulfate ($TiOSO_4$), untreated metatitanic acid [titanium oxyhydroxide ($TiO(OH)_2$)] particles are obtained.

From the viewpoint of expressing a high photocatalytic function, a BET specific surface area of the untreated metatitanic acid particles is, for example, preferably equal to or greater than 50 $m^2/g$ and equal to or smaller than 300 $m^2/g$, more preferably equal to or greater than 80 $m^2/g$ and equal to or smaller than 280 $m^2/g$, and even more preferably equal to or greater than 120 $m^2/g$ and equal to or smaller than 250 $m^2/g$. The BET specific surface area of the metatitanic acid particles is determined by a gas adsorption method using a nitrogen gas.

Untreated Titanium Oxide Particles

Examples of the untreated titanium oxide particles include particles of titanium oxide of a brookite type, an anatase type, a rutile type, and the like. The titanium oxide particles may have either a single crystal structure such as brookite, anatase, and rutile, or a mixed crystal structure in which these crystals coexist. The method for preparing the untreated titanium oxide particles is not particularly limited, and examples thereof include a chlorine method (gas phase method) and a sulfuric acid method (liquid phase method).

From the viewpoint of expressing a high photocatalytic function, a BET specific surface area of the untreated titanium oxide particles is, for example, preferably equal to or greater than 20 $m^2/g$ and equal to or smaller than 250 $m^2/g$, more preferably equal to or greater than 50 $m^2/g$ and equal to or smaller than 200 $m^2/g$, and even more preferably equal to or greater than 80 $m^2/g$ and equal to or smaller than 180 $m^2/g$.

The BET specific surface area of the titanium oxide particles is determined by a gas adsorption method using a nitrogen gas.

Untreated Titanium Oxide Aerogel Particles

It is better that the untreated titanium oxide aerogel particles are manufactured by a sol-gel method using a titanium alkoxide as a material.

Although there is no particular limitation, it is preferable that the untreated titanium oxide aerogel particles are formed of a hydrolysis condensate of a titanium alkoxide.

Here, a portion of the alkoxy group in the titanium alkoxide may remain in the particles in an unreacted state.

From the viewpoint of expressing a high photocatalytic function, a BET specific surface area of the untreated titanium oxide aerogel particles is, for example, preferably equal to or greater than 120 $m^2/g$ and equal to or smaller than 1,000 m $m^2/g$, more preferably equal to or greater than 150 $m^2/g$ and equal to or smaller than 900 $m^2/g$, and even more preferably equal to or greater than 180 $m^2/g$ and equal to or smaller than 800 $m^2/g$. The BET specific surface area of the untreated titanium oxide aerogel particles is determined by a gas adsorption method using a nitrogen gas.

Hereinafter, a manufacturing method of the untreated titanium oxide aerogel particles will be described.

Although there is no particular limitation, it is preferable that the manufacturing method of the untreated titanium oxide aerogel particles includes at least the following (1) and (2).

(1) Making porous particles containing titanium oxide by sol-gel method and preparing dispersion liquid containing the porous particles and solvent (preparation of dispersion liquid)

(2) Removing the solvent from the dispersion liquid by using supercritical carbon dioxide (removal of solvent)

1. Preparation of Dispersion Liquid

In the preparation of a dispersion liquid, for example, by using a titanium alkoxide as a material, titanium oxide is generated by causing reactions (hydrolysis and condensation) of the titanium alkoxide, thereby obtaining a dispersion liquid in which titanium oxide-containing porous particles are dispersed in a solvent.

Specifically, the preparation of a dispersion liquid is performed as below, for example.

A titanium alkoxide is added to an alcohol and stirred, and in this state, an aqueous solution of an acid is added dropwise thereto such that the titanium alkoxide reacts and generates titanium oxide, thereby obtaining a dispersion liquid in which titanium oxide-containing porous particles are dispersed in an alcohol (porous particle dispersion liquid).

By the amount of the titanium alkoxide added in the preparation of a dispersion liquid, the primary particle diameter of the porous particles can be controlled. The larger the amount of the titanium alkoxide added, the smaller the primary particle diameter of the porous particles. A mass ratio of the titanium alkoxide to the alcohol is, for example, preferably equal to or higher than 0.04 and equal to or lower than 0.65, and more preferably equal to or higher than 0.1 and equal to or lower than 0.5.

Examples of the titanium alkoxide used in the preparation of a dispersion liquid include an alkoxy titanium chelate obtained by chelating some of alkoxy groups of tetraalkoxytitanium such as tetramethoxytitanium, tetraethoxytitanium, tetrapropoxytitanium, or tetrabutoxytitanium, di-i-propoxy•bis(ethylacetate)titanium, di-i-propoxy-bis(acetylacetonate)titanium, and the like. One kind of each of these may be used singly, or two or more kinds of these may be used in combination.

The titanium oxide aerogel particles may contain small amounts of metal elements other than titanium, such as silicon or aluminum. In this case, tetraalkoxysilane such as tetramethoxysilane, tetraethoxysilane, tetrapropoxysilane, or tetrabutoxysilane, alkyl trialkoxysilane such as methyl trimethoxysilane, methyl triethoxysilane, or ethyl triethoxysilane, alkyl dialkoxysilane such as dimethyl dimethoxysilane or dimethyl diethoxysilane, aluminum alkoxide such as aluminum isopropoxide, and the like may also be used. In a case where the particles contain a silicon element, Si/Ti which is an elementary ratio between silicon and titanium can be within a range of 0 to 0.05.

Examples of the alcohol used in the preparation of a dispersion liquid include methanol, ethanol, propanol, butanol, and the like. One kind of each of these may be used singly, or two or more kinds of these may be used in combination.

Examples of the acid in the aqueous solution of an acid used in the preparation of a dispersion liquid include oxalic acid, acetic acid, hydrochloric acid, nitric acid, and the like. The acid concentration in the aqueous solution of an acid is, for example, preferably equal to or higher than 0.001% by mass and equal to or lower than 1% by mass, and more preferably equal to or higher than 0.005% by mass and equal to or lower than 0.01% by mass.

In the preparation of a dispersion liquid, the amount of the aqueous solution of an acid added dropwise with respect to 100 parts by mass of the titanium alkoxide is, for example, preferably equal to or greater than 0.001 parts by mass and equal to or smaller than 0.1 parts by mass.

For example, in the porous particle dispersion liquid obtained by the preparation of a dispersion liquid, the concentration of solid contents is preferably equal to or higher than 1% by mass and equal to or lower than 30% by mass.

2. Removal of Solvent

In the removal of a solvent, supercritical carbon dioxide is brought into contact with the dispersion liquid containing the porous particles and a solvent, thereby removing the solvent. Compared to a solvent removing treatment performed by heating, the solvent removing treatment performed using supercritical carbon dioxide hardly causes crushing or blocking of the porous particles. In the removal of a solvent, the solvent is removed using supercritical carbon dioxide. Therefore, it is possible to obtain titanium oxide aerogel particles having a BET specific surface area equal to or greater than 120 $m^2/g$.

Specifically, the removal of a solvent is performed by the following operation, for example.

The porous particle dispersion liquid is put into an airtight reactor, and then liquid carbon dioxide is introduced into the reactor. Thereafter, the airtight reactor is heated, and the internal pressure of the airtight reactor is increased using a high-pressure pump such that the carbon dioxide in the airtight reactor becomes in a supercritical state. Furthermore, liquid carbon dioxide is caused to flow into the airtight reactor such that the supercritical carbon dioxide flows out of the airtight reactor. In this way, the supercritical carbon dioxide flows in the porous particle dispersion liquid in the airtight reactor. While the supercritical carbon dioxide is flowing in the porous particle dispersion liquid, the solvent is dissolved in the supercritical carbon dioxide and is removed along with the supercritical carbon dioxide flowing out of the airtight reactor.

The internal temperature and pressure of the airtight reactor are set such that carbon dioxide becomes in a supercritical state. The critical points of carbon dioxide are 31.1° C./7.38 MPa. Therefore, the internal temperature of the reactor is set to be equal to or greater than 50° C. and equal to or lower than 200° C., and the internal pressure of the reactor is set to be equal to or higher than 10 MPa and equal to or lower than 30 MPa.

Untreated Silica-Titania Composite Aerogel Particles

The untreated silica-titania composite aerogel particles contain a silica-titania complex, which is a composite oxide of silicon and titanium, as a main component (component taking up the highest proportion among all the components of the particles).

In the untreated silica-titania composite aerogel particles, from the viewpoint of expressing a photocatalytic function in the range of visible light, the value of Si/Ti which is an elementary ratio between silicon and titanium is, for example, preferably higher than 0 and equal to or lower than 6, more preferably equal to or higher than 0.05 and equal to or lower than 4, and even more preferably equal to or higher than 0.1 and equal to or lower than 3.

The elementary ratio (Si/Ti) between silicon atoms and titanium atoms is determined by creating elementary profiles of the silica-titania complex by performing qualitative analysis (wide scan analysis) of XPS. Specifically, Si/Ti is determined as below.

By using an XPS analyzer, in the following settings, qualitative analysis (wide scan analysis) is performed in a state of etching the silica titania complex from the surface thereof in a depth direction, thereby identifying and quantifying titanium atoms, silicon atoms, and carbon atoms. From the obtained data, for titanium atoms, silicon atoms, and carbon atoms, elementary profiles with ordinate showing peak intensity and abscissa showing etching time are created. Each of the profile curves is divided into a plurality of regions based on a point of inflection, a region (region A which will be described later) where the peak intensity of the titanium atoms and the peak intensity of the silicon atoms are substantially the same as each other is specified, and the elementary ratio Si/Ti in this region is determined.

XPS analyzer: ULVAC-PHI, INCORPORATED, Versa Probe II X-ray source: monochromatic Alka rays
Accelerating voltage: 15 kV
X-ray beam diameter: 100 μm
Etching gun: argon ion beam
Etching power: 4 kV In the untreated silica-titania composite aerogel particles, the total content of the silica component and the titania component with respect to the total mass of the complex is, for example, preferably equal to or greater than 80% by mass, more preferably equal to or greater than 90% by mass, and even more preferably equal to or greater than 95% by mass.

Each of the untreated silica-titania composite aerogel particles may be a particle having a mother particle, in which the elementary ratio Si/Ti between silicon and titanium is higher than 0 and equal to or lower than 6, and a titania layer (layer formed of titania) present on the surface of the mother particle. That is, each of the untreated silica-titania composite aerogel particles may be a particle having a titania layer as a surface layer. In a case where these particles are used, the photocatalytic function is improved.

From the viewpoint of expressing a high photocatalytic function, the BET specific surface area of the silica-titania composite aerogel particles is, for example, preferably equal to or greater than 200 $m^2/g$ and equal to or smaller than 1,200 $m^2/g$, more preferably equal to or greater than 300 $m^2/g$ and equal to or smaller than 1,100 $m^2/g$, and even more preferably equal to or greater than 400 $m^2/g$ and equal to or smaller than 1,000 $m^2/g$. The BET specific surface area of the silica-titania composite aerogel particles is determined by a gas adsorption method using a nitrogen gas.

As a manufacturing method of the untreated silica-titania composite aerogel particles, although there is no particular limitation, a sol-gel method in which alkoxysilane and a titanium alkoxide are used as materials is preferable.

Although there is no particular limitation, it is preferable that the untreated silica-titania composite aerogel particles are formed of a hydrolysis condensate of alkoxysilane and a titanium alkoxide. Here, in some cases, a portion of a hydrocarbon group in an alkoxy group of the alkoxysilane or the titanium alkoxide remains in the complex in an unreacted state.

Hereinafter, a manufacturing method of the untreated silica-titania composite aerogel particles will be described.

Although there is no particular limitation, it is preferable that the manufacturing method of the untreated silica-titania composite aerogel particles includes at least the following (1') and (2').

(1') Making porous particles containing silica-titania complex by sol-gel method and preparing dispersion liquid containing the porous particles and solvent (preparation of dispersion liquid)

(2') Removing the solvent from the dispersion liquid by using supercritical carbon dioxide (removal of solvent)

1'. Preparation of Dispersion Liquid

In the preparation of a dispersion liquid, for example, by using alkoxysilane and a titanium alkoxide as materials, a silica-titania complex is generated by causing reactions (hydrolysis and condensation) between the materials, thereby obtaining a dispersion liquid in which porous particles containing the silica-titania complex are dispersed in a solvent. Although there is no particular limitation, it is preferable that the porous particles are aggregated particles in which primary particles containing the silica-titania complex are aggregated while forming a porous structure.

Specifically, the preparation of a dispersion liquid is performed as below.

Alkoxysilane and a titanium alkoxide are added to an alcohol and stirred, and in this state, an aqueous solution of an acid is added dropwise thereto such that the alkoxysilane and the titanium oxide react with each other and generate a silica-titania complex, thereby obtaining a dispersion liquid in which silica-titania complex-containing porous particles are dispersed in an alcohol (porous particle dispersion liquid).

By controlling the mixing ratio between the alkoxysilane and the titanium oxide in the preparation of a dispersion liquid, it is possible to control the elementary ratio Si/Ti between silicon and titanium in the untreated silica-titania composite aerogel particles.

In the preparation of a dispersion liquid, by the total amount of the alkoxysilane and the titanium alkoxide with respect to the amount of alcohol, it is possible to control the particle diameter of primary particles constituting the untreated silica-titania aerogel particles and the particle diameter of the untreated silica-titania aerogel particles.

The larger the total amount with respect to the amount of alcohol, the smaller the particle diameter of primary particles constituting the untreated silica-titania composite aerogel particles, and the larger the particle diameter of the untreated silica-titania composite aerogel particles. The total amount of the alkoxysilane and the titanium alkoxide with respect to 100 parts by mass of the alcohol is, for example, preferably equal to or greater than 4 parts by mass and equal to or smaller than 250 parts by mass, and more preferably equal to or greater than 10 parts by mass and equal to or smaller than 50 parts by mass.

Examples of the alkoxysilane used in the preparation of a dispersion liquid include tetraalkoxysilane such as tetramethoxysilane, tetraethoxysilane, tetrapropoxysilane, or tetrabutoxysilane, alkyl trialkoxysilane such as methyl trimethoxysilane, methyl triethoxysilane, or ethyl triethoxysilane, alkyl dialkoxysilane such as dimethyl dimethoxysilane or dimethyl diethoxysilane, and the like. One kind of each of these may be used singly, or two or more kinds of these may be used in combination.

Examples of the titanium alkoxide used in the preparation of a dispersion liquid include an alkoxytitanium chelate obtained by chelating some of alkoxy groups of tetraalkoxy titanium such as tetramethoxytitanium, tetraethoxytitanium, tetrapropoxytitanium, or tetrabutoxytitanium, di-i-propoxy•bis(ethylacetacetate)titanium, di-i-propoxy•bis(acetylacetonate)titanium, and the like. One kind of each of these may be used singly, or two or more kinds of these may be used in combination.

Examples of the alcohol used in the preparation of a dispersion liquid include methanol, ethanol, propanol, butanol, and the like. One kind of each of these may be used singly, or two or more kinds of these may be used in combination.

Examples of the acid in the aqueous solution of an acid used in the preparation of a dispersion liquid include oxalic acid, acetic acid, hydrochloric acid, nitric acid, and the like. The acid concentration in the aqueous solution of an acid is, for example, preferably equal to or higher than 0.001% by mass and equal to or lower than 1% by mass, and more preferably equal to or higher than 0.005% by mass and equal to or lower than 0.01% by mass.

In the preparation of a dispersion liquid, the amount of the aqueous solution of an acid added dropwise with respect to a total of 100 parts by mass of the alkoxysilane and the titanium alkoxide is, for example, preferably equal to or greater than 0.001 parts by mass and equal to or smaller than 0.1 parts by mass.

For example, in the porous particle dispersion liquid obtained by the preparation of a dispersion liquid, the concentration of solid contents is preferably equal to or higher than 1% by mass and equal to or lower than 30% by mass.

2'. Removal of Solvent

In the removal of a solvent, supercritical carbon dioxide is brought into contact with the dispersion liquid containing the porous particles and a solvent, thereby removing the solvent. Compared to a solvent removing treatment performed by heating, the solvent removing treatment performed using supercritical carbon dioxide hardly causes crushing or blocking of the pores of the porous particles (particularly, aggregated particles in which primary particles are aggregated while forming a porous structure). In the removal of a solvent, the solvent is removed using supercritical carbon dioxide. Therefore, it is possible to obtain untreated silica-titania composite aerogel particles having a BET specific surface area equal to or greater than $200 \text{ m}^2/\text{g}$.

Specifically, the removal of a solvent is performed by the following operation, for example.

The porous particle dispersion liquid is put into an airtight reactor, and then liquid carbon dioxide is introduced into the reactor. Thereafter, the airtight reactor is heated, and the internal pressure of the airtight reactor is increased using a high-pressure pump such that the carbon dioxide in the airtight reactor becomes in a supercritical state. Furthermore, liquid carbon dioxide is caused to flow into the airtight reactor such that the supercritical carbon dioxide flows out of the airtight reactor. In this way, the supercritical carbon dioxide flows in the porous particle dispersion liquid in the airtight reactor. While the supercritical carbon dioxide is flowing in the porous particle dispersion liquid, the solvent is dissolved in the supercritical carbon dioxide and is removed along with the supercritical carbon dioxide flowing out of the airtight reactor.

The internal temperature and pressure of the airtight reactor are set such that carbon dioxide becomes in a supercritical state. The critical points of carbon dioxide are 31.1° C./7.38 MPa. Therefore, the internal temperature of the reactor is set to be equal to or greater than 50° C. and equal to or lower than 200° C., and the internal pressure of the reactor is set to be equal to or higher than 10 MPa and equal to or lower than 30 MPa.

In a case where particles each having a titania layer on the surface thereof are manufactured as the untreated silica-titania composite aerogel particles, it is better to perform the following (i) and (ii) in (1') preparation of dispersion liquid.

(i) Alkoxysilane and a titanium alkoxide are added to an alcohol and stirred, and in this state, an aqueous solution of an acid is added dropwise thereto such that the alkoxysilane and the titanium oxide react with each other and generate a silica-titania complex, thereby obtaining a dispersion liquid in which mother particles containing a silica-titania complex are dispersed in an alcohol (first dispersion liquid).

(ii) A mixed solution obtained by mixing an alcohol with a titanium alkoxide is added dropwise to the first dispersion liquid with stirring such that the mother particles and the titanium alkoxide react with each other and generate porous particles in which an interlayer is formed on the surface of the mother particles, thereby obtaining a dispersion liquid in which the porous particles are dispersed in an alcohol (second dispersion liquid).

Organic Metal Compound

The organic metal compound is a metal compound having a metal atom and a hydrocarbon group.

From the viewpoint of more easily adsorbing germs and from the viewpoint of more easily expressing responsiveness to visible light, although there is no particular limitation, it is preferable that the organic metal compound is a metal compound formed only of a metal atom, a carbon atom, a hydrogen atom, and an oxygen atom.

From the viewpoint of more easily expressing responsiveness to visible light, although there is no particular limitation, it is preferable that the organic metal compound is bonded to the surface of each of the particles through an oxygen atom O directly bonded to a metal atom M in the organic metal compound, in other words, it is preferable that the organic metal compound is bonded to the surface of each of the particles through a covalent bond represented by M-O—Ti (in a case where the titanium-based compound particles are silica-titania composite aerogel particles, the covalent bond is M-O—Ti or M-O—Si).

From the viewpoint of more easily adsorbing germs and from the viewpoint of more easily expressing responsiveness to visible light, as the organic metal compound, an organic metal compound having a metal atom M and a hydrocarbon group directly bonded to the metal atom M. Although there is no particular limitation, it is preferable that the organic metal compound is bonded to the surface of each of the particles through an oxygen atom O directly bonded to the metal atom M in the organic metal compound. That is, from the viewpoint of more easily adsorbing germs and from the viewpoint of more easily expressing responsiveness to visible light, although there is no particular limitation, it is preferable that a structure, in which a hydrocarbon group, the metal atom M, the oxygen atom O, and a titanium atom Ti are connected to each other in this order through a covalent bond (a hydrocarbon group-M-O—Ti (in a case where the titanium-based compound particles are silica-titania composite aerogel particles, hydrocarbon group-M-O-TI or hydrocarbon group-M-O—Si)), is present on the surface of the particles.

In a case where the organic metal compound has a plurality of hydrocarbon groups, although there is no particular limitation, it is preferable that at least one hydrocarbon group is directly bonded to the metal atom in the organic metal compound.

The state where the atoms are chemically bonded to each other in the organic metal compound can be ascertained by performing high-resolution analysis (narrow scan analysis) of X-ray Photoelectron Spectroscopy (XPS).

As the metal atom M in the organic metal compound, for example, a silicon atom, an aluminum atom, or a titanium atom is preferable, a silicon atom or an aluminum atom is more preferable, and a silicon atom is particularly preferable.

Examples of the hydrocarbon group that the organic metal compound has include a saturated or unsaturated aliphatic hydrocarbon group having 1 to 40 carbon atoms (for example, preferably having 1 to 20 carbon atoms, more preferably having 1 to 18 carbon atoms, even more preferably having 4 to 12 carbon atoms, and still more preferably having 4 to 10 carbon atoms) and an aromatic hydrocarbon group having 6 to 27 carbon atoms (for example, preferably having 6 to 20 carbon atoms, more preferably having 6 to 18 carbon atoms, even more preferably having 6 to 12 carbon atoms, and particularly preferably having 6 to 10 carbon atoms).

From the viewpoint of expressing a high photocatalytic function and improving dispersibility, the hydrocarbon group that the organic metal compound has is, for example, preferably an aliphatic hydrocarbon group, more preferably a saturated aliphatic hydrocarbon group, and particularly preferably an alkyl group. The aliphatic hydrocarbon group may be any of linear, branched, and cyclic aliphatic hydrocarbon groups. From the viewpoint of dispersibility, the aliphatic hydrocarbon group is, for example, preferably a linear or branched aliphatic hydrocarbon group.

The number of carbon atoms in the aliphatic hydrocarbon group is, for example, preferably equal to or greater than 1 and equal to or smaller than 20, more preferably equal to or greater than 1 and equal to or smaller than 18, even more preferably equal to or greater than 4 and equal to or smaller than 12, and particularly preferably equal to or greater than 4 and equal to or smaller than 10.

As the organic metal compound, although there is no particular limitation, a silane compound having a hydrocarbon group is particularly preferable. Examples of the silane compound having a hydrocarbon include a chlorosilane compound, an alkoxysilane compound, and the like.

From the viewpoint of expressing a high photocatalytic function and improving dispersibility, as the silane compound having a hydrocarbon group, although there is no particular limitation, a compound represented by Formula (1): $R^1{}_n SiR^2{}_m$ is preferable.

In Formula (1): $R^1{}_n SiR^2{}_m$, $R^1$ represents a saturated or unsaturated aliphatic hydrocarbon group having 1 to 20 carbon atoms or an aromatic hydrocarbon group having 6 to 20 carbon atoms, $R^2$ represents a halogen atom or an alkoxy group, n represents an integer equal to or greater than 1 and equal to or smaller than 3, m represents an integer equal to or greater than 1 and equal to or smaller than 3, and n+m=4. In a case where n is an integer 2 or 3, a plurality of $R^1$'s may be the same groups or different groups. In a case where m is an integer 2 or 3, a plurality of $R^2$'s may be the same groups or different groups.

The aliphatic hydrocarbon group represented by $R^1$ may be any of linear, branched, and cyclic aliphatic hydrocarbon groups. From the viewpoint of dispersibility, the aliphatic hydrocarbon group is, for example, preferably a linear or branched aliphatic hydrocarbon group. From the viewpoint of expressing a high photocatalytic function and improving dispersibility, the number of carbon atoms in the aliphatic hydrocarbon group is, for example, preferably equal to or greater than 1 and equal to or smaller than 20, more preferably equal to or greater than 1 and equal to or smaller than 18, even more preferably equal to or greater than 4 and equal to or smaller than 12, and still more preferably equal to or greater than 4 and equal to or smaller than 10. The aliphatic hydrocarbon group may be any of saturated and unsaturated aliphatic hydrocarbon groups. From the viewpoint of expressing a high photocatalytic function and improving dispersibility, the aliphatic hydrocarbon group is, for example, preferably a saturated aliphatic hydrocarbon group, and more preferably an alkyl group.

Examples of the saturated aliphatic hydrocarbon group include a linear alkyl group (a methyl group, an ethyl group, a propyl group, a butyl group, a pentyl group, a hexyl group, a heptyl group, an octyl group, a nonyl group, a decyl group, a dodecyl group, a hexadecyl group, an eicosyl group, or the like), a branched alkyl group (an isopropyl group, an isobutyl group, an isopentyl group, a neopentyl group, a 2-ethylhexyl group, a t-butyl group, a t-pentyl group, an isopentadecyl group, or the like), a cycloalkyl group (a cyclopropyl group, a cyclopentyl group, a cyclohexyl group, a cycloheptyl group, a cyclooctyl group, a tricyclodecyl group, a norbornyl group, an adamantyl group, or the like), and the like.

Examples of the unsaturated aliphatic hydrocarbon group include an alkenyl group (a vinyl group (ethenyl group), a 1-propenyl group, a 2-propenyl group, a 2-butenyl group, a 1-butenyl group, a 1-hexenyl group, a 2-dodecenyl group, a pentenyl group, or the like), an alkynyl group (an ethynyl group, a 1-propynyl group, a 2-propynyl group, a 1-butynyl group, a 3-hexynyl group, a 2-dodecynyl group, or the like), and the like.

The aliphatic hydrocarbon group also includes a substituted aliphatic hydrocarbon group.
Examples of the substituent which can substitute the aliphatic hydrocarbon group include a halogen atom, an epoxy group, a glycidyl group, a glycidoxy group, a mercapto group, a methacryloyl group, an acryloyl group, and the like.

The number of carbon atoms in the aromatic hydrocarbon group represented by $R^1$ is, for example, preferably equal to or greater than 6 and equal to or smaller than 20, more preferably equal to or greater than 6 and equal to or smaller than 18, even more preferably equal to or greater than 6 and equal to or smaller than 12, and still more preferably equal to or greater than 6 and equal to or smaller than 10.

Examples of the aromatic hydrocarbon group include a phenylene group, a biphenylene group, a terphenylene group, a naphthalene group, an anthracene group, and the like.

The aromatic hydrocarbon group also includes a substituted aromatic hydrocarbon group. Examples of the substituent which can substitute the aromatic hydrocarbon group include a halogen atom, an epoxy group, a glycidyl group, a glycidoxy group, a mercapto group, a methacryloyl group, an acryloyl group, and the like.

Examples of the halogen atom represented by $R^2$ include a fluorine atom, a chlorine atom, a bromine atom, an iodine atom, and the like. As the halogen atom, although there is no particular limitation, a chlorine atom, a bromine atom, or an iodine atom is preferable.

Examples of the alkoxy group represented by $R^2$ include an alkoxy group having 1 to 10 carbon atoms (for example, preferably having 1 to 8 carbon atoms, and more preferably having 3 to 8 carbon atoms). Examples of the alkoxy group include a methoxy group, an ethoxy group, an isopropoxy group, a t-butoxy group, a n-butoxy group, a n-hexyloxy group, a 2-ethylhexyloxy group, a 3,5,5-trimethylhexyloxy group, and the like. The alkoxy group also includes a substituted alkoxy group. Examples of the substituent which can substitute the alkoxy group include a halogen atom, a hydroxyl group, an amino group, an alkoxy group, an amide group, a carbonyl group, and the like.

From the viewpoint of expressing a high photocatalytic function and improving dispersibility, as the compound represented by Formula (1): $R^1{}_n SiR^2{}_m$, although there is no particular limitation, a compound in which $R^1$ is a saturated aliphatic hydrocarbon group is preferable. Particularly, as the compound represented by Formula (1): $R^1{}_n SiR^2{}_m$, although there is no particular limitation, a compound is preferable in which $R^1$ is a saturated aliphatic hydrocarbon group having 1 to 20 carbon atoms, $R^2$ is a halogen atom or an alkoxy group, n is an integer equal to or greater than 1 and equal to or smaller than 3, m is an integer equal to or greater than 1 and equal to or smaller than 3, and n+m=4.

Examples of the compound represented by Formula (1): $R^1{}_n SiR^2{}_m$ include silane compounds such as vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, phenyltrichlorosilane (in the above compounds, n=1, and m=3); dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, dichlorodiphenylsilane, (in the above compounds, n=2, and m=2); trimethylmethoxysilane, trimethylethoxysilane, trimethylchlorosilane, decyldimethylchlorosilane, triphenylchlorosilane (in the above compounds, n=3, and m=1); 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and γ-glycidyloxypropylmethyldimethoxysilane (in the above compounds, $R^1$ is a substituted aliphatic hydrocarbon group or a substituted aromatic hydrocarbon group). One kind of silane compound may be used singly, or two or more kinds silane compounds may be used in combination.

From the viewpoint of expressing a high photocatalytic function and improving dispersibility, the hydrocarbon group in the silane compound represented by Formula (1) is, for example, preferably an aliphatic hydrocarbon group, more preferably a saturated aliphatic hydrocarbon group, and particularly preferably an alkyl group. From the viewpoint of expressing a high photocatalytic function and improving dispersibility, the hydrocarbon group in the above silane compound is, for example, preferably a saturated aliphatic hydrocarbon group having 1 to 20 carbon atoms, more preferably a saturated aliphatic hydrocarbon group having 1 to 18 carbon atoms, even more preferably a saturated aliphatic hydrocarbon group having 4 to 12 carbon atoms, and particularly preferably a saturated aliphatic hydrocarbon group having 4 to 10 carbon atoms.

Examples of the organic metal compound having aluminum as a metal atom include alkyl aluminate such as triethoxy aluminum, tri-i-propoxy aluminum, or tri-sec-butoxy aluminum; aluminum chelate such as di-i-propoxy•mono-sec-butoxy aluminum or di-i-propoxy aluminum-ethyl acetoacetate; an aluminate-based coupling agent such as acetoalkoxyaluminum diisopropylate; and the like.

Examples of the organic metal compound having titanium as a metal atom include a titanate-based coupling agent such as isopropyltriisostearoyl titanate, tetraoctyl bis(ditridecylphosphite)titanate, or bis(dioctylpyrophosphate)oxyacetate titanate; titanium chelate such as di-i-propoxybis(ethylacetoacetate)titanium, di-i-propoxybis(acetylacetonate)titanium, di-i-propoxybis(triethanolaminate)titanium, di-i-propoxytitanium diacetate, or di-i-propoxytitanium dipropionate; and the like.

One kind of organic metal compound may be used singly, or two or more kinds of organic metal compounds may be used in combination.

Manufacturing Method of Photocatalyst Particles

The manufacturing method of the photocatalyst particles is not particularly limited. For example, by treating the surface of untreated particles with an organic metal compound, the photocatalyst particles are obtained.

Hereinafter, examples of aspects of the manufacturing method of the photocatalyst particles will be described.

For example, it is preferable that the manufacturing method of the photocatalyst particles include (a) performing a surface treatment on untreated particles by using an organic metal compound and (b) performing a heating treatment in the process of or after the surface treatment performed on the untreated particles.

a. Performing Surface Treatment

The method for performing a surface treatment on untreated particles by using an organic metal compound is not particularly limited. Examples thereof include a method of bringing an organic metal compound into direct contact with untreated particles; and a method of bringing a treatment solution, which is obtained by dissolving an organic metal compound in a solvent, into contact with untreated particles. Specifically, examples thereof include a method of adding an organic metal compound or a treatment solution to a dispersion liquid, which is obtained by dispersing untreated particles in a solvent, with stirring; and a method of adding an organic metal compound or a treatment solution (by dripping, spraying, or the like) to untreated particles in a fluid state by means of stirring using a Henschel mixer or the like. By these methods, a reactive group (for example, a hydrolysable group such as a halogeno group or an alkoxy group) in the organic metal compound reacts with a hydroxyl group present on the surface of the untreated particles, whereby the surface of the untreated particles is treated.

The surface treatment can be performed in the atmosphere or in a nitrogen atmosphere. In a case where the surface treatment is performed on titanium oxide aerogel particles or silica-titania composite aerogel particles as untreated particles, although there is no particular limitation, it is preferable to perform the surface treatment in supercritical carbon dioxide. In a case where the surface treatment is performed as above, the organic metal compound reaches a portion deep inside the pores of the porous particles, and the surface treatment is performed deep into the pores of the porous particles. Accordingly, although there is no particular limitation, it is preferable to perform the surface treatment in supercritical carbon dioxide.

The surface treatment is performed in supercritical carbon dioxide, for example, by mixing and reacting together the organic metal compound and the porous particles in supercritical carbon dioxide with stirring. In addition, the surface treatment is carried out, for example, by preparing a treatment solution by means of mixing together the organic metal compound and a solvent and mixing together the porous particles and the treatment solution in supercritical carbon dioxide with stirring. In order to increase the specific surface area while maintaining the porous structure of the porous particles, although there is no particular limitation, it is preferable to add the organic metal compound to supercritical carbon dioxide after the finish of the removal of a solvent, and to cause the organic metal compound to react with the surface of the porous particles in the supercritical carbon dioxide.

Examples of the solvent dissolving the organic metal compound include an organic solvent (for example, a hydrocarbon-based solvent, an ester-based solvent, an ether-based solvent, a halogen-based solvent, an alcohol-based solvent, or the like), water, a mixed solvent of these, and the like. Examples of the hydrocarbon-based solvent include toluene, benzene, xylene, hexane, octane, hexadecane, cyclohexane, and the like. Examples of the ester-based solvent include methyl acetate, ethyl acetate, isopropyl acetate, amyl acetate, and the like. Examples of the ether-based solvent include dibutyl ether, dibenzyl ether, and the like. Examples of the halogen-based solvent include 1,1-dichloro-1-fluoroethane, 1,1-dichloro-2,2,2-trifluoroethane, 1,1-dichloro-2,2,3,3,3-pentafluoropropane, chloroform, dichloroethane, carbon tetrachloride, and the like. Examples of the alcohol-based solvent include methanol, ethanol, i-propyl alcohol, and the like. Examples of the water include tap water, distilled water, pure water, and the like. As the solvent, in addition to these, solvents such as dimethyl formamide, dimethyl acetamide, dimethyl sulfoxide, acetic acid, and sulfuric acid may also be used.

In the treatment solution obtained by dissolving the organic metal compound in a solvent, the concentration of the organic metal compound is, for example, preferably equal to or higher than 0.05 mol/L and equal to or lower than 500 mol/L, and more preferably equal to or higher than 0.5 mol/L and equal to or lower than 10 mol/L.

From the viewpoint of expressing a high photocatalytic function and improving dispersibility, it is better that the surface treatment performed on the particles by using an organic metal compound is carried out under the following conditions. It is better that the surface treatment is performed on untreated particles by using an organic metal compound in an amount equal to or greater than 10% by mass and equal to or smaller than 100% by mass (for example, preferably equal to or greater than 20% by mass and equal to or smaller than 75% by mass, and more preferably equal to or greater than 25% by mass and equal to or smaller than 50% by mass) with respect to the untreated particles. In a case where the amount of the organic metal compound is equal to or greater than 10% by mass, a high photocatalytic function is more easily expressed even in the range of visible light, and dispersibility is easily improved. In a case where the amount of the organic metal compound is equal to or smaller than 100% by mass, the amount of metals, which are present on the surface of the particles and derived from the organic metal compound, is inhibited from increasing too much, and the deterioration of the photocatalytic function resulting from an excess of metal is inhibited.

The temperature of the surface treatment performed on the untreated particles by using the organic metal compound is, for example, preferably equal to or higher than 15° C. and equal to or lower than 150° C., and more preferably equal to or higher than 20° C. and equal to or lower than 100° C. The surface treatment time is, for example, preferably equal to or longer than 10 minutes and equal to or shorter than 120 minutes, and more preferably equal to or longer than 30 minutes and equal to or shorter than 90 minutes.

Here, in a case where the surface treatment is performed in supercritical carbon dioxide, the temperature and pressure for the surface treatment are set such that the carbon dioxide becomes in a supercritical state. For example, the surface treatment is performed in an atmosphere with a temperature equal to or higher than 50° C. and equal to or lower than 200° C. under a pressure equal to or higher than 10 MPa and equal to or lower than 30 MPa. The reaction time is, for example, preferably equal to or longer than 10 minutes and equal to or shorter than 24 hours, more preferably equal to or longer than 20 minutes and equal to or shorter than 120 minutes, and even more preferably equal to or longer than 30 minutes and equal to or shorter than 90 minutes.

After the surface treatment performed on the untreated particles by using the organic metal compound, it is better to perform a drying treatment. The drying treatment method is not particularly limited, and for example, known drying methods such as a vacuum drying method and a spray drying method are used. The drying temperature is, for example, preferably equal to or higher than 20° C. and equal to or lower than 150° C.

Here, in a case where the surface treatment is performed in supercritical carbon dioxide, for example, the solvent is preferably removed from the dispersion liquid containing the porous particles by using supercritical carbon dioxide, and more preferably removed by allowing supercritical carbon dioxide to flow in supercritical carbon dioxide after the finish of the surface treatment.

b. Performing Heating Treatment

The heating treatment is performed while the surface treatment is being performed on the untreated particles or after the surface treatment is performed on the untreated particles.

The heating treatment can be performed at the time of carrying out the surface treatment on the untreated particles by using the organic metal compound; performed at the time of carrying out the drying treatment after the surface treatment; or separately performed after the drying treatment. For example, the heating treatment is preferably performed at the time of carrying out the drying treatment after the surface treatment or separately performed after the drying treatment from the viewpoint of thoroughly reacting the particles with the organic metal compound before the heat treatment, and more preferably separately performed after the drying treatment from the viewpoint of appropriately carrying out the drying treatment.

From the viewpoint of expressing a high photocatalytic function and improving dispersibility, the temperature of the heating treatment is, for example, preferably equal to or higher than 180° C. and equal to or lower than 500° C., more preferably equal to or higher than 200° C. and equal to or lower than 450° C., and even more preferably equal to or higher than 250° C. and equal to or lower than 40° C. From the viewpoint of expressing a high photocatalytic function and improving dispersibility, the time of the heating treatment is, for example, preferably equal to or longer than 10 minutes and equal to or shorter than 300 minutes, and more preferably equal to or longer than 30 minutes and equal to or shorter than 120 minutes. In a case where the heating treatment is performed while the surface treatment is being performed on the untreated particles, although there is no particular limitation, it is preferable to first allow the organic metal compound to thoroughly react at the temperature of the surface treatment and then perform the heating treatment at the temperature of the heating treatment. In a case where the heating treatment is performed during the drying treatment after the surface treatment, the drying treatment is performed at the temperature of the heating treatment.

In a case where the temperature of the heating treatment is equal to or higher than 180° C. and equal to or lower than 500° C., particles expressing a high photocatalytic function even in the range of visible light are obtained. Presumably, in a case where the heating treatment is performed at a temperature equal to or higher than 180° C. and equal to or lower than 500° C., the hydrocarbon group derived from the metal compound present on the surface of the particles may be appropriately oxidized, and some of the C—C bonds or C═C bonds may change to C—O bonds or C═O bonds.

Although there is no particular limitation, it is preferable that the heating treatment is performed in an atmosphere with an oxygen concentration (% by volume) equal to or higher than 1% and equal to or lower than 21%. In a case where the heating treatment is performed in such an oxygen atmosphere, the hydrocarbon group derived from the metal compound present on the surface of the particles can be appropriately and oxidized. For example, the oxygen concentration (% by volume) is more preferably equal to or higher than 3% and equal to or lower than 21%, and even more preferably equal to or higher than 5% and equal to or lower than 21%.

The heating treatment method is not particularly limited. For example, known methods such as heating performed using an electric furnace, a kiln (a roller hearth kiln, a shuttle kiln, or the like), a radiation-type heating furnace, or the like; and heating performed using laser light, infrared rays, UV, microwaves, or the like are used.

Through the steps described so far, the photocatalyst particles are obtained.

Characteristics of Photocatalyst Particles

The photocatalyst particles have absorption at a wavelength of 500 nm in a visible absorption spectrum. From the viewpoint of expressing a high photocatalytic function even in the range of visible light, in a visible absorption spectrum, for example, the photocatalyst particles preferably have absorption at a wavelength of 450 nm and a wavelength of 500 nm, more preferably have absorption at a wavelength of 450 nm, a wavelength of 500 nm, and a wavelength of 550 nm, even more preferably have absorption at a wavelength of 450 nm, a wavelength of 500 nm, a wavelength of 550 nm, and a wavelength of 600 nm, and particularly preferably have absorption at a wavelength of 450 nm, a wavelength of 500 nm, a wavelength of 550 nm, a wavelength of 600 nm, and a wavelength of 700 nm.

From the viewpoint of expressing a high photocatalytic function even in the range of visible light, in a visible absorption spectrum, for example, the photocatalyst particles preferably have absorption in the entire range of a wavelength equal to or longer than 450 nm and equal to or shorter than 500 nm, more preferably have absorption in the entire range of a wavelength equal to or longer than 400 nm and equal to or shorter than 550 nm, even more preferably have absorption in the entire range of a wavelength equal to or longer than 400 nm and equal to or shorter than 600 nm, and particularly preferably have absorption in the entire range of a wavelength equal to or longer than 400 nm and equal to or shorter than 700 nm.

From the viewpoint of expressing a high photocatalytic function even in the range of visible light, provided that an absorbance at a wavelength of 350 nm in an ultraviolet visible absorption spectrum is 1, the absorbance of the photocatalyst particles at each wavelength in a visible absorption spectrum is preferably as below, for example.

Absorbance at wavelength of 450 nm: equal to or higher than 0.02, preferably equal to or higher than 0.1, more preferably equal to or higher than 0.2, and even more preferably equal to or higher than 0.3, for example Absorbance at wavelength of 500 nm: equal to or higher than 0.02, preferably equal to or higher than 0.1, more preferably equal to or higher than 0.2, and even more preferably equal to or higher than 0.3, for example Absorbance at wavelength of 550 nm: equal to or higher than 0.02, preferably equal to or higher than 0.1, more preferably equal to or higher than 0.15, and even more preferably equal to or higher than 0.2, for example Absorbance at wavelength of 600 nm: equal to or higher than 0.02, preferably equal to or higher than 0.05, and more preferably equal to or higher than 0.1, for example Absorbance at wavelength of 700 nm: equal to or higher than 0.02, preferably equal to or higher than 0.05, and more preferably equal to or higher than 0.08, for example From the viewpoint of expressing a high photocatalytic function even in the range of visible light, in a visible absorption spectrum, a ratio of absorbance of the photocatalyst particles at a wavelength of 550 nm to the absorbance thereof at a wavelength of 450 nm (550 nm/450 nm) is, for example, preferably equal to or higher than 0.1, more preferably equal to or higher than 0.2, even more preferably equal to or higher than 0.3, and still more preferably equal to or higher than 0.4.

The titanium-based compound particles as the photocatalyst particles tend to exhibit ultraviolet absorbing properties. The photocatalyst particles, which are obtained by performing surface modification on the titanium-based compound particles and exhibit responsiveness to visible light, particularly relatively strongly absorb blue light having a wavelength close to that of ultraviolet rays among visible lights. Therefore, in a case where the ratio of absorbance represented by 550 nm/450 nm is equal to or higher than 0.1, it is understood that the titanium-based compound particles are sufficiently surface-modified as visible range-responsive photocatalyst particles.

The ratio of absorbance, represented by 550 nm/450 nm, of the visible light-responsive photocatalyst particles obtained by performing surface modification on the titanium-based compound particles tends to be less than 1. The ratio of absorbance of the photocatalyst particles tends to be equal to or lower than 0.8.

The ultraviolet visible absorption spectrum of the photocatalyst particles is obtained by the following method. Particles to be measured are dispersed in tetrahydrofuran, then applied onto a glass substrate, and dried in the atmosphere at 24° C. By using a spectrophotometer (for example, U-4100 manufactured by Hitachi High-Technologies Corporation, scan speed: 600 nm/min, slit width: 2 nm, sampling interval: 1 nm), in a diffuse reflective disposition, a diffuse reflectance spectrum in a wavelength range of 200 nm to 900 nm is measured.

From the diffuse reflectance spectrum, absorbance at each wavelength is theoretically determined by Kubelka-Munk transformation.

The glass substrate is affected by the film thickness of the applied particles or the like, and hence an error may occur in the measured value. Therefore, the measured value is corrected. That is, an absorbance at 900 nm is subtracted from the absorbance at each wavelength, and the obtained value is adopted as an absorbance at each wavelength.

In an infrared absorption spectrum, the photocatalyst particles have an absorption peak in a range of wave number equal to or greater than 2,700 cm$^{-1}$ and equal to or smaller than 3,000 cm$^{-1}$.

Specifically, for example, in an infrared absorption spectrum, it is preferable that the photocatalyst particles have at least one absorption peak in a range of wave number equal to or greater 2,700 cm$^{-1}$ and equal to or smaller than 3,000 cm$^{-1}$. Having an absorption peak means having absorption with absorption intensity (absorbance) equal to or higher than 0.022 (5% in terms of transmittance).

The infrared absorption spectrum of the photocatalyst particles is measured by the following method. First, the photocatalyst particles to be measured are prepared as a measurement sample by a KBr tablet preparation method. Then, by using an infrared spectrophotometer (manufactured by JASCO Corporation: FT-IR-410), the measurement sample is measured within a range of wave number equal to or greater than 500 cm$^{-1}$ and equal to or smaller than 4,000 cm$^{-1}$ under the conditions of the number of times of accumulation of 300 and resolution of 4 cm$^{-1}$, thereby obtaining an infrared absorption spectrum.

The average primary particle diameter of the photocatalyst particles is, for example, equal to or greater than 1 nm and equal to or smaller than 200 nm, more preferably equal to or greater than 5 nm and equal to or smaller than 150 nm, and even more preferably equal to or greater than 10 nm and equal to or smaller than 100 nm. In a case where the average primary particle diameter of the photocatalyst particles is equal to or greater than 1 nm, the particles are hardly aggregated, and the photocatalytic function is easily enhanced. In a case where the average primary particle diameter of the photocatalyst particles is equal to or smaller than 200 nm, the ratio of the specific surface area to the amount is increased, and hence the photocatalytic function is easily enhanced. Therefore, in a case where the average primary particle diameter of the photocatalyst particles is within the above range, a high photocatalytic function is easily expressed in the range of visible light.

The average primary particle diameter of the photocatalyst particles is a value measured by the following measurement method.

The photocatalyst particles are observed and imaged using a scanning electron microscope (manufactured by Hitachi, LTD., S-4100). The captured image is input into an image analyzer (manufactured by NIRECO, LUZEX III), the area of each particle is determined by image analysis, and an equivalent circle diameter (nm) is determined from the area. The arithmetic mean of equivalent circle diameters of 100 primary particles is calculated and adopted as the average diameter of the primary particles.

In a case where the photocatalyst particles are silica-titania composite aerogel particles, as the photocatalyst particles, it is better to use particles obtained by performing a surface treatment on untreated silica-titania composite aerogel particles having a titania layer as a surface layer by using an organic metal compound. In a case where the photocatalyst particles are silica-titania composite aerogel particles, as the photocatalyst particles, it is better to use particles obtained by performing a surface treatment on untreated silica-titania composite aerogel particles having a titania layer as a surface layer by using an organic metal compound.

Specifically, each of these particles has a mother particle (for example, a mother particle in which an elementary ratio Si/Ti between silicon and titanium is higher than 0 and equal to or lower than 6), a titania layer present on the surface of the mother particle (hereinafter, referred to as "interlayer" as well), and a layer which is formed on the surface of the titania layer by bonding of a metal compound having a metal atom and a hydrocarbon group to the surface through an oxygen atom (that is, a layer containing a metal compound having a metal atom and a hydrocarbon group, hereinafter, referred to as "surface layer" as well).

Whether each of the silica-titania composite aerogel particles has the layers described above can be checked by the following method. Whether particles other than the silica-titania composite aerogel particles have the surface layer can also be checked by the following method.

The qualitative analysis (wide scan analysis) of XPS is performed in a state of etching the silica-titania composite aerogel particles in the depth direction from the surface thereof by using rare gas ions. In this way, at least titanium, silicon, and carbon are identified and quantified. From the obtained data, for at least each of the titanium, silicon, and carbon, an elementary profile with ordinate showing peak intensity and abscissa showing etching time is created.

The profile curve is divided into a plurality of regions based on a point of inflection, and a region reflecting the elementary composition of the mother particle, a region reflecting the elementary composition of the interlayer, and a region reflecting the elementary composition of the surface layer are specified. In a case where the region reflecting the elementary composition of the interlayer is in the elementary profile, it is determined that the silica-titania composite aerogel particles have the interlayer. In a case where the region reflecting the elementary composition of the surface layer is in the elementary profile, it is determined that the silica-titania composite aerogel particles have the surface layer.

Hereinafter, the elementary profile will be described based on FIG. 7 for example.

Figure 7:
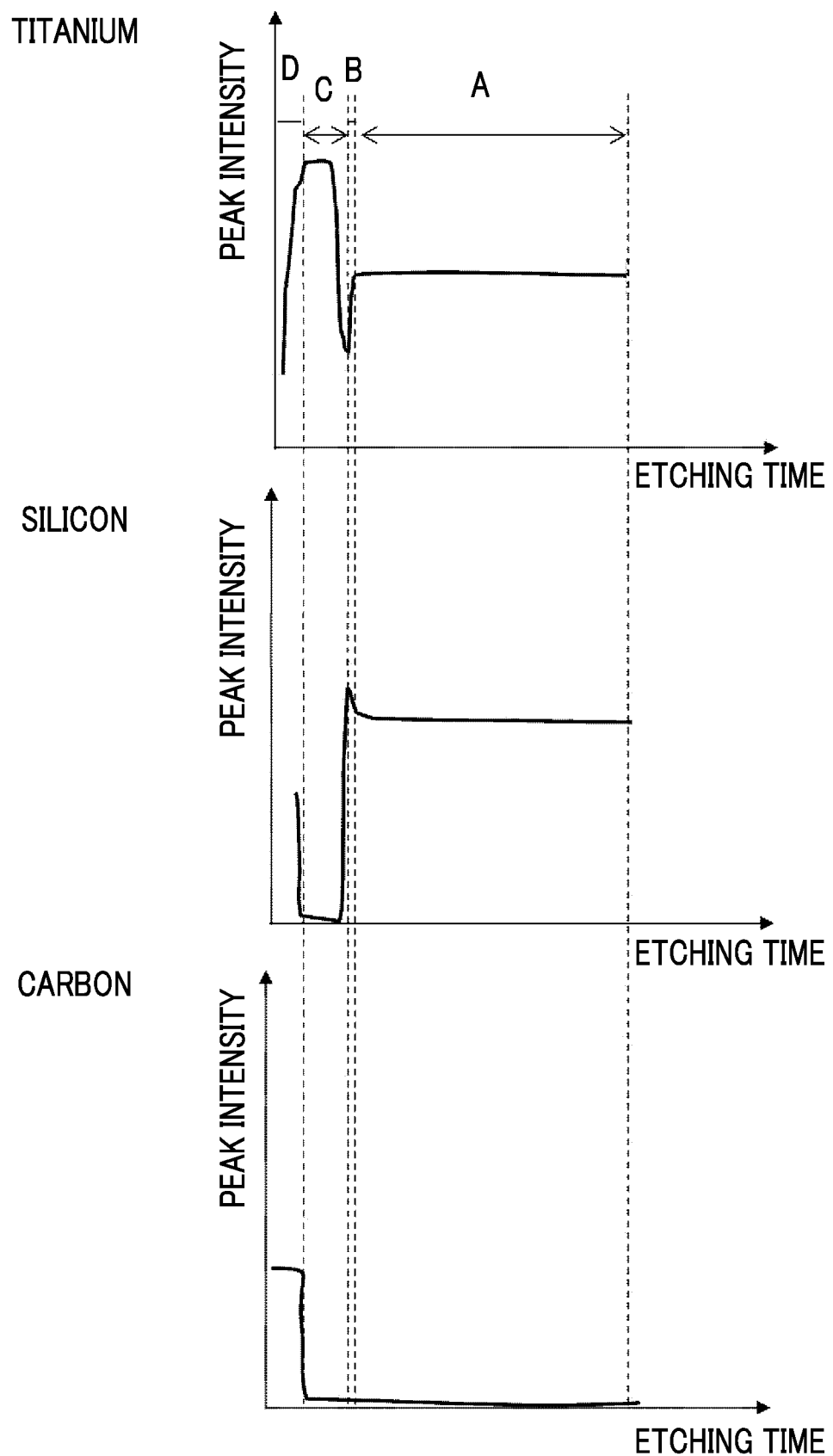
FIG. 7 shows an example of elementary profiles of silica-titania composite particles that are constituted with the elementary profile of titanium, the elementary profile of silicon, and the elementary profile of carbon in this order from top.

FIG. 7 shows an example of elementary profiles of silica-titania composite aerogel particles that are constituted with the elementary profile of titanium, the elementary profile of silicon, and the elementary profile of carbon in this order from top.

Each of the elementary profiles shown in FIG. 7 is divided into a region A, a region B, a region C, and a region D based on the point of inflection of the profile curve.

Region A: region which exists at the last state of etching and in which peak intensity of titanium and peak intensity of silicon are substantially constant.

Region B: region which exists immediately before region A and in the peak intensity of titanium is reduced toward the particle surface while the peak intensity of silicon is increased toward the particle surface.

Region C: region which exists immediately before region B and in which peak intensity of titanium is substantially constant and substantially no silicon is detected.

Region D: region which exists at the initial stage of etching and in which peak intensity of carbon is substantially constant and no metal atom is detected.

The region A and the region B are regions reflecting the elementary composition of the mother particles. At the time of manufacturing the mother particles, silica and titania form a covalent bond at a ratio according to the mixing ratio between the alkoxysilane and the titanium alkoxide as materials of the silica-titania complex, thereby forming the mother particles.

Here, on the surface of the mother particles, silica tends to more easily appear compared to titania. As a result, in the elementary profile, the region A, in which the peak intensity of titanium and the peak intensity of silicon are substantially constant, appears at the last stage of etching, and the region B, in which the peak intensity of titanium is reduced toward the particle surface while the peak intensity of silicon is increased toward the particle surface, appears immediately before the region A.

The region C is a region reflecting the elementary composition of the interlayer. In a case where the region C, that is, a region, in which the peak intensity of titanium is substantially constant and substantially no silicon is detected, exists immediately before the region B, it is determined that the silica-titania composite aerogel particles have an interlayer which is "titania layer".

Although the region C is a region reflecting the elementary composition of a first layer, the region C does not necessarily completely coincide with the interlayer. In the region C, sometimes the side close to the region B reflects the elementary composition of the mother particles as well.

The region D is a region reflecting the elementary composition of the surface layer. In a case where the region D, that is, a region, in which the peak intensity of carbon is substantially constant and a metal element is detected as well, exists at the initial stage of etching, it is determined that the silica-titania composite aerogel particles have "layer containing the metal compound having a metal atom and a hydrocarbon group" as the surface layer.

Examples of candidates for the metal atom constituting the metal compound in the surface layer include silicon, aluminum, and titanium. Accordingly, if necessary, the identification and quantification of aluminum are performed by XPS, and an elementary profile is also created for aluminum.

Although the region D is a region reflecting the elementary composition of the surface layer, the region D does not necessarily completely coincide with a second layer. In the region D, sometimes the side close to the region C reflects the elementary composition of the first layer as well.

From the elementary profiles shown in FIG. 7, it is determined that the particles are silica-titania composite aerogel particles each having a mother particle, an interlayer, and a surface layer, in which the metal atom constituting the metal compound in the surface layer is silicon.

Characteristics of catalyst-supporting porous particles (water purification particles and medium particles for water culture) and the like.

From the viewpoint of sterilizing and purifying the aqueous medium (for example, from the viewpoint of sterilizing and purifying the culture solution), the amount of the supported photocatalyst particles with respect to the catalyst-supporting porous particles is, for example, preferably equal to or greater than 1% by mass and equal to or smaller than 60% by mass, more preferably equal to or greater than 5% by mass and equal to or smaller than 50% by mass, and even more preferably equal to or greater than 10% by mass and equal to or smaller than 40% by mass.

The amount of the supported photocatalyst particles is determined based on JIS K 7250-1 (2006) by the following formula.

Amount of supported photocatalyst particles (% by mass)=[mass of ash obtained by firing at 600° C./mass of dried porous particles]×100

From the viewpoint of sterilizing and purifying the aqueous medium (for example, from the viewpoint of sterilizing and purifying the culture solution), the visible light transmittance of the catalyst-supporting porous particles is, for example, equal to or higher than 1% and equal to or lower than 80%, more preferably equal to or higher than 10% and equal to or lower than 30%, and even more preferably equal to or higher than 15% and equal to or lower than 25%.

In a case where the visible light transmittance of the catalyst-supporting porous particles is within the above range, visible light easily reaches the supported photocatalyst particles, and the aqueous medium is easily sterilized and purified (for example, the culture solution is easily sterilized and purified).

The visible light transmittance is measured as below.

A total light transmittance (%) is measured using a haze meter (NDH-2000 manufactured by NIPPON DENSHOKU INDUSTRIES Co., LTD). The porous particles are disposed in a glass petri dish as a single layer, and a state where only the particles are removed is set as blank. Then, the total light transmittance (%) is measured in a state where the porous particles are disposed in the glass petri dish as a single layer, and the measured value is adopted as a visible light transmittance.

The visible light transmittance of the catalyst-supporting porous particles is measured in a state where the photocatalyst particles are supported on the porous substance.

From the viewpoint of sterilizing and purifying the aqueous medium (for example, from the viewpoint of sterilizing and purifying the culture solution), a liquid absorption rate of the catalyst-supporting porous particles is, for example, equal to or higher than 5% and equal to or lower than 100%, more preferably equal to or higher than 10% and equal to or lower than 80%, and even more preferably equal to or higher than 15% and equal to or lower than 50%.

In a case where the liquid absorption rate of the catalyst-supporting porous particles is within the above range, the probability that the germs in the aqueous medium (culture solution or the like) to be purified and the supported photocatalyst particles will contact each other is heightened, and hence the aqueous medium is easily sterilized and purified (for example, the culture solution is easily sterilized and purified).

The liquid absorption rate of the catalyst-supporting porous particles is measured as below.

As a sample, approximately 1 g of the catalyst-supporting porous particles is weighed (the weight is denoted as $m_1$) and put into a stainless steel sieve (inner diameter 75 mm×height 20 mm) having a pore size of 750 μm.

Then, the sieve with the sample is immersed for 10 minutes in a petri dish made of glass (inner diameter 146 mm×height 28 mm) containing 300 mL of pure water (in a case where the catalyst-supporting porous particles are not immersed in water due to floating or the like, a fixing tool such as a mesh is used as necessary).

Thereafter, the mass of the sample after immersion is measured (the mass is denoted as $m_2$).

Subsequently, the liquid absorption rate is calculated by the following calculation formula.

Liquid absorption rate=$(m_2/10 \times 2 - m_1)/m_1 \times 100$ $m_1$=mass of sample before immersion (g)
$m_2$=mass of sample after immersion (g)

This operation is performed 3 times, and the average thereof is adopted as the liquid absorption rate.

From the viewpoint of sterilizing and purifying the aqueous medium (for example, from the viewpoint of sterilizing and purifying the culture solution), a BET specific surface area of the catalyst-supporting porous particles is, for example, preferably equal to or greater than 1 m$^2$/g and equal to or smaller than 300 m$^2$/g, more preferably equal to or greater than 10 m$^2$/g and equal to or smaller than 200 m$^2$/g, and even more preferably equal to or greater than 20 m$^2$/g and equal to or smaller than 150 m$^2$/g.

In a case where the BET specific surface area of the catalyst-supporting porous particles is within the above range, the probability that the germs in the aqueous medium (culture solution or the like) to be purified and the supported photocatalyst particles will contact each other is heightened, and hence the aqueous medium is easily sterilized and purified (for example, the culture solution is easily sterilized and purified).

The BET specific surface area of the catalyst-supporting porous particles is measured in a state where the photocatalyst particles are supported on the porous particles.

The BET specific surface area is determined by a gas adsorption method using a nitrogen gas.

From the viewpoint of sterilizing and purifying the aqueous medium (for example, from the viewpoint of sterilizing and purifying the culture solution), a ratio of the amount (kg) of the supported photocatalyst particles in the catalyst-supporting porous particles to the volume (L) of the culture solution held in the container of the water culture apparatus (or the aqueous medium held in the container of the water purification apparatus) (amount of supported photocatalyst particles/volume of culture solution or aqueous medium) is, for example, preferably equal to or higher than $0.04 \times 10^{-3}$ kg/L and equal to or lower than $300 \times 10^{-3}$ kg/L, more preferably equal to or higher than $0.08 \times 10^{-3}$ kg/L and equal to or lower than $200 \times 10^{-3}$ kg/L, and even more preferably equal to or higher than $0.16 \times 10^{-3}$ kg/L and equal to or lower than $150 \times 10^{-3}$ kg/L.

From the viewpoint of sterilizing and purifying the aqueous medium (for example, from the viewpoint of sterilizing and purifying the culture solution), a ratio of the total surface area (m$^2$) of the catalyst-supporting porous particles (=BET specific surface area of catalyst-supporting porous particles× mass of catalyst-supporting porous particles) to the volume (L) of the culture solution held in the container of the water culture apparatus (or the aqueous medium held in the container of the water purification apparatus) (total surface area of catalyst-supporting porous particles/volume of culture solution or aqueous medium) is, for example, preferably equal to or higher than 0.04 m$^2$/L and equal to or lower than 140,000 m$^2$/L, more preferably equal to or higher than 8 m$^2$/L and equal to or lower than 70,000 m$^2$/L, and even more preferably equal to or higher than 300 m$^2$/L and equal to or lower than 35,000 m$^2$/L.

Manufacturing Method of Catalyst-Supporting Porous Particles

The manufacturing method of the catalyst-supporting porous particles according to the present embodiment is not particularly limited, and examples thereof include a method of causing photocatalyst particles to be supported on a porous substance by coating porous substance particles with a dispersion liquid, in which the photocatalyst particles are dispersed, or immersing porous substance particles in the dispersion liquid and then drying the dispersion liquid.

In this method, because the photocatalyst particles formed of the specific titanium-based compound particles described above have a large specific surface area and a strong adhesive force, the photocatalyst particles directly adhere to the surface of the porous particles or to the inner wall of pores of the porous particles and are fixed thereto. As the coating method, known coating methods such as dip coating and spray coating may be adopted. Examples of dispersion media of the dispersion liquid to be used include volatile dispersion media such as water and various alcohols. Furthermore, a method of causing the photocatalyst particles to be supported on the porous particles by using a binder resin may also be adopted.

Examples of the manufacturing method of the catalyst-supporting porous particles according to the present embodiment also include known methods (the methods described in JP2001-198472A) (for example, the methods described in the following 1) to 5)), the method described in JP2001-240759A (for example, the method described in the following 6), the method described in JP2004-027428A (for example, the method described in the following 7)) and the like.

1) Method of manufacturing catalyst-supporting porous particles through causing the coagulation or regeneration in a mixed solution containing a hydrophilic polymer, a pore forming agent, and photocatalyst particles so as to obtain hydrophilic porous polymer substance supporting a photocatalyst, and causing the hydrophilic porous polymer substance supporting a photocatalyst to swell so as to react at least one kind of water-soluble compound with a basic substance in the interior of the hydrophilic porous polymer substance supporting a photocatalyst 2) Method of manufacturing catalyst-supporting porous particles through causing a hydrophilic porous polymer substance to swell so as to react at least one kind of water-soluble compound with a basic substance in the interior of the hydrophilic porous polymer substance and to obtain a hydrophilic porous polymer substance having an inorganic ion exchanger in the interior thereof, and causing photocatalyst particles to be supported on the hydrophilic porous polymer substance having the inorganic ion exchanger in the interior thereof 3) Method of manufacturing catalyst-supporting porous particles by causing the coagulation or the coagulation and regeneration in a mixed solution containing a hydrophilic polymer, a pore forming agent, and an inorganic ion exchanger 4) Method of manufacturing catalyst-supporting porous particles through causing the coagulation or the coagulation and regeneration in a mixed solution containing a hydrophilic polymer, a pore forming agent, and an inorganic ion exchanger so as to obtain a hydrophilic porous polymer substance having an inorganic ion exchanger in the interior thereof, and causing photocatalyst particles to be supported on the hydrophilic porous polymer substance having the inorganic ion exchanger in the interior thereof 5) Method of manufacturing catalyst-supporting porous particles by causing a hydrophilic porous polymer substance to swell in the presence of photocatalyst particles so as to react at least one kind of water-soluble compound with a basic substance in the hydrophilic porous polymer substance 6) Method of manufacturing catalyst-supporting porous particles by causing the coagulation and precipitation of photocatalyst particles in a polyvalent metal ion-containing inorganic ion exchanger-hydrophilic polymer complex, in which an inorganic ion exchanger containing a polyvalent metal ion is in the interior of hydrophilic porous polymer particles, by using a polyvalent metal ion eluted through cation exchange with a monovalent cation 7) Method of manufacturing catalyst-supporting porous particles by adding a hydrophilic binder to a solution, which is obtained by mixing together hydrophilic fiber and photocatalyst particles, so as to cause granulation, and then insolubilizing the hydrophilic binder

EXAMPLES

Hereinafter, embodiments of the invention will be specifically described based on examples, but the embodiments of the invention are not limited to the examples. In the following description, unless otherwise specified, "part" is based on mass in all cases.

Preparation of Photocatalyst Particles
Metatitanic Acid Particles MTA1

Anatase seeds, that are separately prepared, are added to a titanyl sulfate solution with a $TiO_2$ concentration of 260 g/L and a $Ti^{3+}$ concentration of 6.0 g/L in terms of $TiO_2$, in an amount of 9% by mass in terms of $TiO_2$ with respect to $TiO_2$ in the titanyl sulfate solution. Then, the solution is heated at a temperature equal to or higher than the boiling point thereof such that the titanyl sulfate ($TiOSO_4$) is hydrolyzed and granular metatitanic acid is generated. Thereafter, the metatitanic acid particles are filtered and washed, then made into a slurry, and neutralized and washed at pH 7. In this way, a metatitanic acid slurry having an average primary particle diameter of 35 nm is obtained.

Subsequently, a 5 N aqueous sodium hydroxide solution is added to the metatitanic acid slurry having an average primary particle diameter of 35 nm with stirring, and the mixture is continuously stirred for 2 hours at pH 8.5, neutralized to pH 5.8 by using 6N hydrochloric acid, and filtered and washed with water. After washing, water is added thereto such that the mixture turns into a slurry again, 6N hydrochloric acid is added thereto with stirring such that pH thereof becomes 1.3, and the slurry is continuously stirred for 3 hours. From this slurry, 100 parts by mass of metatitanic acid is isolated, continuously heated at 60° C., 35 parts by mass of hexyltrimethoxysilane is added thereto with stirring, the mixture is stirred for 30 minutes, a 7N aqueous sodium hydroxide solution is then added thereto such that the mixture is neutralized to pH 7, and the mixture is filtered and washed with water. The residue obtained after filtration and washing with water is spray-dried by using a flash drier under the condition of an exit temperature of 150° C., thereby obtaining a dry powder. In an electric furnace with an oxygen concentration set to be 12% (% by volume), a heating treatment is performed on the obtained dry powder at 280° C. for 90 minutes, thereby obtaining metatitanic acid particles MTA1. The BET specific surface area of the metatitanic acid particles MTA1 is measured and found to be 250 $m^2/g$.

Metatitanic Acid Particles MTA2

Metatitanic acid particles MTA2 having an average primary particle diameter of 65 nm and a BET specific surface area of 140 $m^2/g$ are obtained by the same method as that used for obtaining the metatitanic acid particles MTA1, except that the amount of the anatase seeds added is changed to 6.5% by mass.

Metatitanic Acid Particles MTA3

Metatitanic acid particles MTA3 having an average primary particle diameter of 130 nm and a BET specific surface area of 55 m$^2$/g are obtained by the same method as that used for obtaining the metatitanic acid particles MTA1, except that the amount of the anatase seeds added is changed to 4.5% by mass.

Titanium Oxide Particles TO1

Hexyltrimethoxysilane is added dropwise to a dispersion liquid, which is obtained by dispersing commercial anatase-type titanium oxide particles ("ST-01 (manufactured by ISHIHARA SANGYO KAISHA, LTD.)", average primary particle diameter: 8 nm) in methanol, in an amount of 35% by mass with respect to the untreated titanium oxide particles, and reacted for 1 hour at 40° C. Then, the reaction solution is spray-dried at an exit temperature of 120° C., thereby obtaining a dry powder.

Thereafter, in an electric furnace with an oxygen concentration (% by volume) set to be 18%, a heating treatment is performed on the obtained dry powder at 290° C. for 1 hour, thereby obtaining titanium oxide particles TO1. The BET specific surface area of the titanium oxide particles TO1 is measured and found to be 185 m$^2$/g.

Titanium Oxide Particles TO2

Octyltrimethoxysilane is added dropwise to a dispersion liquid, which is obtained by dispersing commercial anatase-type titanium oxide particles ("ST-21 (manufactured by ISHIHARA SANGYO KAISHA, LTD.)", average primary particle diameter: 20 nm) in methanol, in an amount of 35% by mass with respect to the untreated titanium oxide particles, and reacted for 1 hour at 40° C. Then, the reaction solution is spray-dried at an exit temperature of 120° C., thereby obtaining a dry powder.

Thereafter, in an electric furnace with an oxygen concentration (% by volume) set to be 20%, a heating treatment is performed on the obtained dry powder at 270° C. for 1 hour, thereby obtaining titanium oxide particles TO2. The BET specific surface area of the titanium oxide particles TO2 is measured and found to be 130 m$^2$/g.

Titanium Oxide Particles TO3

Hexyltrimethoxysilane is added dropwise to a dispersion liquid, which is obtained by dispersing anatase-type titanium oxide particles prepared by a sol-gel method and having an average primary particle diameter of 160 nm in methanol, in an amount of 20% by mass with respect to the untreated titanium oxide particles, and reacted for 1 hour at 40° C. Then, the reaction solution is spray-dried at an exit temperature of 120° C., thereby obtaining a dry powder. Thereafter, in an electric furnace with an oxygen concentration (% by volume) set to be 18%, a heating treatment is performed on the obtained dry powder at 300° C. for 1 hour, thereby obtaining titanium oxide particles TO3. The BET specific surface area of the titanium oxide particles TO3 is measured and found to be 20 m$^2$/g.

Titanium Oxide Aerogel Particles TOAG1

Methanol (115.4 parts) and 14.3 parts of tetrabutoxytitanium are put into a reaction container and mixed together. By using a magnetic stirrer, the mixed solution is stirred at 100 rpm, and in this state, 7.5 parts of a 0.009% by mass aqueous oxalic acid solution is added dropwise thereto for 30 seconds. The mixed solution is continuously stirred as it is for 30 minutes, thereby obtaining 137.3 parts (solid contents: 3.4 parts, liquid phase fraction: 133.9 parts) of a dispersion liquid (1).

Thereafter, 137.3 parts of the dispersion liquid (1) is put into a pressure tank and then stirred at 85 rpm, and in this state, by using a high-pressure pump, $CO_2$ is injected into the tank. The temperature and pressure of the pressure tank are increased to 150° C. and 20 MPa respectively such that $CO_2$ becomes in a supercritical state. While stirring is being continued, the supercritical $CO_2$ is allowed to flow in and out, thereby removing 133 parts of the liquid phase for 60 minutes.

Subsequently, by using an entrainer pump, a mixture of 3.4 parts of isobutyltrimethoxysilane and 3.4 parts of methanol is added for 5 minutes to the solid phase remaining after the removal of the liquid phase, and the mixture is kept at 150° C./20 MPa for 30 minutes while being stirred at 85 rpm. While stirring is being continued, the supercritical $CO_2$ is allowed to flow in and out, thereby removing 6.5 parts of the liquid phase for 30 minutes. The pressure of the tank is reduced to the atmospheric pressure for 30 minutes, thereby collecting 4.6 parts of a powder.

Thereafter, 4.0 parts of the powder is weighed and put into an SUS container, subjected to a heating treatment at 315° C. for 60 minutes in an electric furnace with an oxygen concentration (% by volume) set to be 20%, and left to cool down to 30° C. The obtained powder is sieved using a vibrating sieve having a pore size of 45 μm so as to remove coarse particles, thereby obtaining titanium oxide aerogel particles TOAG1 having an average primary particle diameter of 80 nm and a BET specific surface area of 350 m$^2$/g.

Silica-Titania Composite Aerogel Particles STAG1

Methanol (115.4 parts) and 7.2 parts of tetramethoxysilane are put into a reaction container and mixed together. Furthermore, 7.2 parts of tetrabutoxytitanium is put into the container and mixed with the above components.

By using a magnetic stirrer, the mixed solution is stirred at 100 rpm, and in this state, 7.5 parts of a 0.009% by mass aqueous oxalic acid solution is added dropwise thereto for 30 seconds.

The mixed solution is continuously stirred as it is for 30 minutes, thereby obtaining 137.2 parts (solid contents: 4.5 parts, liquid phase fraction: 132.7 parts) of a first dispersion liquid (I-1).

Thereafter, 137.2 parts of the first dispersion liquid (I-1) is put into a pressure tank and then stirred at 85 rpm, and in this state, by using a high-pressure pump, $CO_2$ is injected into the tank. The temperature and pressure of the pressure tank are increased to 150° C. and 20 MPa respectively such that $CO_2$ becomes in a supercritical state. While stirring is being continued, the supercritical $CO_2$ is allowed to flow in and out, thereby removing 132.0 parts of the liquid phase for 60 minutes.

Subsequently, by using an entrainer pump, a mixture of 4.5 parts of isobutyltrimethoxysilane and 4.5 parts of methanol is added for 5 minutes to the solid phase remaining after the removal of the liquid phase, and the mixture is kept at 150° C./20 MPa for 30 minutes while being stirred at 85 rpm. While stirring is being continued, the supercritical $CO_2$ is allowed to flow in and out, thereby removing 8.2 parts of the liquid phase for 30 minutes. The pressure of the tank is reduced to the atmospheric pressure for 30 minutes, thereby collecting 6.0 parts of a powder.

Then, 4.0 parts of the powder is weighed and put into an SUS container and installed on a hot plate. The powder is heated to 380° C., kept as it is for 60 minutes, and then left to cool down to 30° C. The obtained powder is sieved using a vibrating sieve having a pore size of 45 μm so as to remove coarse particles, thereby collecting 3.5 parts of silica-titania composite aerogel particles STAG1 having an average primary particle diameter of 30 nm and a BET specific surface area of 680 m$^2$/g.

Each of the silica-titania composite aerogel particles STAG1 is a particle having a mother particle, in which the elementary ratio Si/Ti between silicon and titanium is 3.1, and a surface layer which is present on the surface of the mother particle and contains isobutyltrimethoxysilane.

Silica-Titania Composite Aerogel Particles STAG2

Methanol (115.4 parts) and 7.2 parts of tetramethoxysilane are put into a reaction container and mixed together. Furthermore, 7.2 parts of tetrabutoxytitanium is put into the container and mixed with the above components.

By using a magnetic stirrer, the mixed solution is stirred at 100 rpm, and in this state, 7.5 parts of a 0.009% by mass aqueous oxalic acid solution is added dropwise thereto for 30 seconds.

The mixed solution is continuously stirred as it is for 30 minutes, thereby obtaining 137.2 parts (solid contents: 4.5 parts, liquid phase fraction: 132.7 parts) of a first dispersion liquid (I-1).

Thereafter, 137.2 parts of the first dispersion liquid (I-1) is put into the reaction container and stirred with a magnetic stirrer at 100 rpm. In this state, a mixed solution of 1.5 parts of tetrabutoxytitanium and 4.5 parts of butanol is added dropwise thereto for 10 minutes. The mixed solution is continuously stirred as it is for 30 minutes, thereby obtaining 143.2 parts (solid contents: 5.0 parts, liquid phase fraction: 138.2 parts) of a second dispersion liquid (II-1).

Thereafter, 143.2 parts of the second dispersion liquid (II-1) is put into a pressure tank and then stirred at 85 rpm, and in this state, by using a high-pressure pump, $CO_2$ is injected into the tank. The temperature and pressure of the pressure tank are increased to 150° C. and 20 MPa respectively such that $CO_2$ becomes in a supercritical state. While stirring is being continued, the supercritical $CO_2$ is allowed to flow in and out, thereby removing 138 parts of the liquid phase for 60 minutes.

Subsequently, by using an entrainer pump, a mixture of 4.5 parts of isobutyltrimethoxysilane and 4.5 parts of methanol is added for 5 minutes to the solid phase remaining after the removal of the liquid phase, and the mixture is kept at 150° C./20 MPa for 30 minutes while being stirred at 85 rpm. While stirring is being continued, the supercritical $CO^2$ is allowed to flow in and out, thereby removing 7.0 parts of the liquid phase for 30 minutes. The pressure of the tank is reduced to the atmospheric pressure for 30 minutes, and 7.2 parts of a powder is collected.

Then, 4.0 parts of the powder is weighed and put into an SUS container and installed on a hot plate. The powder is heated to 450° C., kept as it is for 60 minutes, and then left to cool down to 30° C. The obtained powder is sieved using a vibrating sieve having a pore size of 45 μm so as to remove coarse particles, thereby collecting 3.5 parts of silica-titania composite aerogel particles STAG2 having an average primary particle diameter of 35 nm and a BET specific surface area of 480 m$^2$/g.

Each of the silica-titania composite aerogel particles STAG2 is a particle having a mother particle, in which the elementary ratio Si/Ti between silicon and titanium is 3.1, a titania layer (interlayer) present on the surface of the mother particle, and a surface layer which is present on the surface of the titania layer and contains isobutyltrimethoxysilane.

For the photocatalyst particles prepared as above, the following characteristics are measured according to the method described above. The characteristics of the photocatalyst particles are summarized in Table 1.

Visible absorption spectrum characteristics (described as "Visi characteristics" in table: provided that absorbance at wavelength of 350 nm is 1, absorbance at wavelength of 450 nm, absorbance at wavelength of 500 nm, absorbance at wavelength of 550 nm, absorbance at wavelength of 600 nm, and absorbance at wavelength of 700 nm), Infrared absorption spectrum characteristics (described as "IR characteristics" in table: presence or absence of absorption peak within range of wave number equal to or greater than 2,700 cm$^{-1}$ and equal to or smaller than 3,000 cm$^{-1}$ and wave number of the absorption peak)

Average primary particle diameter (described as "particle diameter DC" in table)

Example A1

As photocatalyst particles, 100 parts of the metatitanic acid particles MTA1 are wet with 50 parts of ethanol, and then added to and mixed with 850 parts of deionized water. Furthermore, 3 parts of polyvinyl alcohol and 0.03 parts of ethylene glycol diglycidyl ether are added thereto and dispersed using an ultrasonic disperser. Hardwood pulp (10 parts, manufactured by NIPPON PAPER INDUSTRIES CO., LTD.) is impregnated with 45 parts of the metatitanic acid particle slurry, then kneaded for 20 minutes with a kneader, and granulated by being extruded from a granulater, and then the particle size thereof is regulated. The obtained granulated substance is dried by being heated at 120° C. In this way, photocatalyst-supporting porous particles are prepared which are formed of hardwood pulp paper (average fiber diameter: 20 μm, average fiber length: 1 mm, hydrophilic) supporting 30% by mass of metatitanic acid particles.

Example A2

Photocatalyst-supporting porous particles are prepared in the same manner as in Example A1, except that the amount of the metatitanic acid particle slurry for impregnation is adjusted to be 85 parts.

Example A3

Photocatalyst-supporting porous particles are prepared in the same manner as in Example A1, except that the amount of the metatitanic acid particle slurry for impregnation is adjusted to be 4 parts.

Example A4

Photocatalyst-supporting porous particles are prepared in the same manner as in Example A1, except that MTA2 is used as metatitanic acid particles and the amount of the metatitanic acid particle slurry for impregnation is adjusted to be 50 parts.

Example A5

Photocatalyst-supporting porous particles are prepared in the same manner as in Example A1, except that MTA3 is used as metatitanic acid particles and the amount of the metatitanic acid particle slurry for impregnation is adjusted to be 47 parts.

Example A6

Photocatalyst-supporting porous particles are prepared in the same manner as in Example A1, except that the metatitanic acid particles are changed to the titanium oxide particles TO1 and the amount of the titanium oxide particle slurry for impregnation is adjusted to be 47 parts.

Example A7

Photocatalyst-supporting porous particles are prepared in the same manner as in Example A1, except that the metatitanic acid particles are changed to the titanium oxide particles TO2 and the amount of the titanium oxide particle slurry for impregnation is adjusted to be 125 parts.

Example A8

Photocatalyst-supporting porous particles are prepared in the same manner as in Example A1, except that the metatitanic acid particles are changed to the titanium oxide particles TO3 and the amount of the titanium oxide particle slurry for impregnation is adjusted to be 45 parts.

Example B1

Hardwood pulp (100 parts, manufactured by NIPPON PAPER INDUSTRIES CO., LTD.), 160 parts of a 4.5% aqueous solution of polyvinyl alcohol, and 0.09 parts of ethylene glycol diglycidyl ether are mixed together, dispersed with an ultrasonic disperser, then kneaded for 20 minutes with a kneader, and granulated by being extruded from a granulater. Thereafter, the particle size thereof is regulated, thereby obtaining porous particles having a particle diameter of 4 mm.

A packed bed device is filled with the porous particles, a 5% solution prepared by dispersing the metatitanic acid particles MTA1 in ethanol is allowed to permeate and circulate in the device for 30 minutes such that the photocatalyst particles are supported on the interior of the porous particles, and the particles are dried by being heated at 60° C., thereby preparing photocatalyst-supporting porous particles.

Example B2

Photocatalyst-supporting porous particles are prepared in the same manner as in Example B1, except that the metatitanic acid particles are changed to the titanium oxide aerogel particles TOAG1.

Example B3

Photocatalyst-supporting porous particles are prepared in the same manner as in Example B1, except that the metatitanic acid particles are changed to silica-titania composite aerogel particles STAG1.

Example B4

Photocatalyst-supporting porous particles are prepared in the same manner as in Example B1, except that the metatitanic acid particles are changed to silica-titania composite aerogel particles STAG2.

Comparative Example 1

Photocatalyst-supporting porous particles are prepared in the same manner as in Example 1, except that commercial titanium oxide particles (trade name "ST-01 (manufactured by ISHIHARA SANGYO KAISHA, LTD.), average particle diameter: 0.012 μm, catalyst particles without photocatalytic function expressed by visible light) are used.

Comparative Example 2

Photocatalyst-supporting porous particles are prepared in the same manner as in Example 1, except that visible light-responsive photocatalyst particles (trade name: LUMILESH, manufactured by Showa Denko Ceramics Co., Ltd.) supporting titanium oxide are used.

Evaluation

Evaluation of Characteristics

For the obtained photocatalyst-supporting porous particles, the following characteristics are measured according to the method described above.

Amount of supported photocatalyst particles with respect to photocatalyst-supporting porous particles (% by mass)

Visible light transmittance of photocatalyst-supporting porous particles (%)

BET specific surface area of photocatalyst-supporting porous particles ($m^2/g$)

Evaluation of Water Purification

Figure 8:
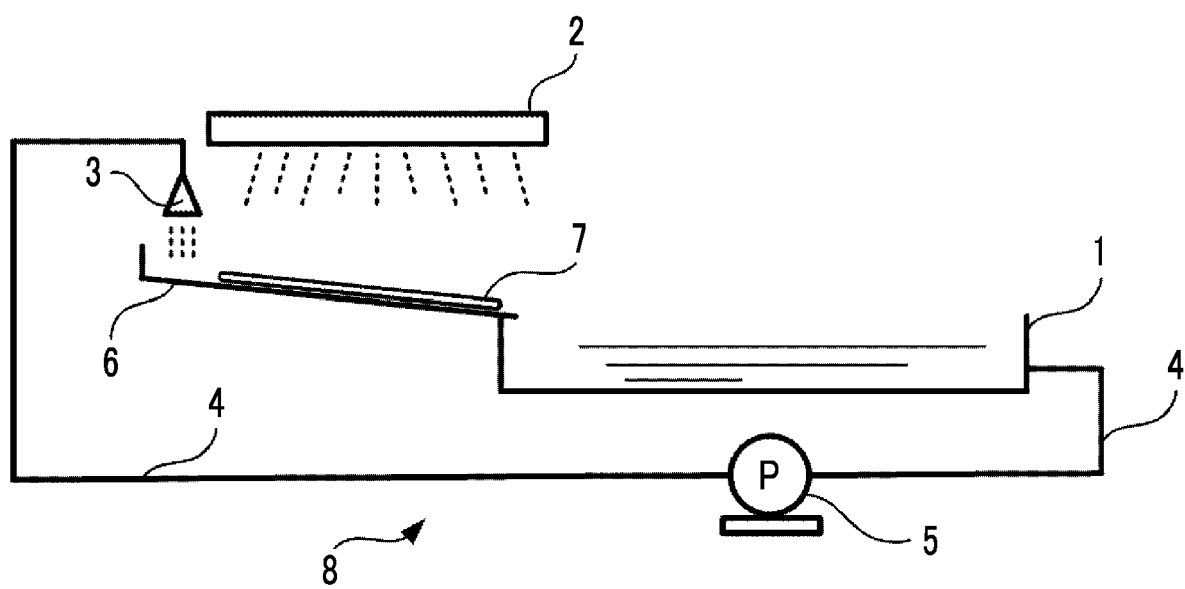
FIG. 8 is a schematic diagram showing a water purification apparatus used in the evaluation of examples.

The water purification apparatus shown in FIG. 8 includes a storage tank 1 (an example of a container), a support 6 which is obliquely disposed in the horizontal direction and on which a medium for water culture 7 is disposed, an LED lighting 2 (an example of a light irradiation device) irradiating a sheet filled with photocatalyst-supporting porous particles disposed on the support 6 with visible light, and a circulation device 8 circulating a culture solution stored in the storage tank 1.

The circulation device 8 includes a transport pipe 4 transporting a culture solution stored in a storage tank 1, a transport pump 5 disposed in the middle of the route of the transport pipe, and a dripping nozzle 3 adding the culture solution transported from the transport pipe 4 dropwise to one end of the support 6.

In the water purification apparatus shown in FIG. 8, in a state where the sheet 7 filled with photocatalyst-supporting porous particles is disposed on the support 6 and sheet 7 filled with photocatalyst-supporting porous particles is irradiated with visible light by the LED lighting 2, the culture solution is added dropwise to one end of the support 6 and supplied to the storage tank 1 through the sheet 7 filled with photocatalyst-supporting porous particles. By the transport pump 5, the culture solution stored in the storage tank 1 is transported through the transport pipe 4 and added dropwise again to one end of the support from the dripping nozzle 3.

In this way, in the water purification apparatus shown in FIG. 8, the culture solution is circulated while being purified by the sheet 7 filled with photocatalyst-supporting porous particles.

By using the evaluation apparatus constituted as shown in FIG. 8, the water purification performance is evaluated as below. In the following description, references will not be mentioned.

1) A sheet filled with photocatalyst-supporting porous particles adjusted to have a size of 0.23 m (width)×0.3 m (length) is installed on the support. The sheet filled with photocatalyst-supporting porous particles is a sheet obtained by filling a mesh bag with photocatalyst-supporting porous particles. Then, the amount of particles filling the sheet is adjusted such that the volume of the sheet (that is, the volume of the particles) becomes the volume shown in Table 2.

2) As a culture solution, 0.5 g of OTSUKA house No. 5 powder is dissolved in 10 L of water. As a nutrient of the culture solution, iron is adjusted to have a concentration of 2.85 ppm. Then, a certain amount of the culture solution is put into the storage tank, and 100 ml of a tomato wilt bacterial spore suspension ($6.2 \times 10^6$ cfu/ml) is added to and mixed with the culture solution.

3) The output of the transport pump is adjusted such that a certain amount of the culture solution in the storage is supplied, and the direction of the dripping nozzle is adjusted such that the culture solution uniformly flows in the entirety of the sheet filled with photocatalyst-supporting porous particles on the support from the dripping nozzle.

4) The illuminance of an LED lighting Z-80PR02-EIZO (manufactured by EIZO Corporation) is adjusted such that the illuminance becomes 20,000 lux on the surface of the sheet filled with catalyst-supporting porous particles, and the transport pipe is moved such that the culture solution is added dropwise to the surface of the sheet filled with photocatalyst-supporting porous particles. In this way, a test for sterilizing tomato wilt bacteria in the culture solution is started.

5) Before the start of the transport of the culture solution and 24 hours after the transport of the culture solution, the culture solution is sampled in an amount of 5 ml from the storage tank, and the water purification performance is evaluated by measuring the number of viable cells in the culture solution. Furthermore, by measuring the iron concentration in the culture solution by means of ion chromatography, the insolubilizing performance of the nutrient is evaluated.

Each evaluation is performed under the following conditions shown in Table 2 and Table 3.

Volume of sheet filled with photocatalyst-supporting porous particles (that is, particles) ($m^3$)

Volume of culture solution held in storage tank (unit: L)

Amount of culture solution supplied to photocatalyst-supporting porous particles per unit time (unit: L/min) (in Table, described as "amount of culture solution supplied")

Calculative flow rate of culture solution flowing through photocatalyst-supporting porous particles that is calculated from amount of culture solution supplied to photocatalyst-supporting porous particles per unit time and volume of photocatalyst-supporting porous particles (unit: L/min/$m^3$) (in Table, described as "flow rate of culture solution")

Ratio of amount SA (Kg) of supported photocatalyst particles in photocatalyst-supporting porous particles to volume V of culture solution held in storage tank (amount of supported photocatalyst particles/volume of culture solution) (in Table, described as "SA/Vol")

Ratio of total surface area S ($m^2$) of photocatalyst-supporting porous particles to volume (L) of culture solution held in storage tank (total surface area of photocatalyst-supporting porous particles/volume of culture solution) (in Table, described as "S/Vol")

The volume of the culture solution held in the storage tank equals the volume of the culture solution held in the container.

The amount of the culture solution supplied to the photocatalyst-supporting porous particles per unit time equals the amount of the culture solution supplied to the container per unit time.

Evaluation of Water Purification Performance

The number of viable cells in the culture solution is measured by the following dilution plate method.

From the collected culture solution sample, 0.1 ml of the solution is isolated and put into a test tube, 9.9 ml of sterilized water is added thereto and shaken, thereby preparing a 10× diluted solution. From this diluted solution, a 100× diluted solution is prepared in the same manner as described above. Furthermore, from the 100× diluted solution, a 1,000× diluted solution is prepared. Then, from the 1,000× diluted solution, 1 ml of the solution is isolated and put into a sterilized petri dish having a diameter of 9 cm, and an agar medium cooled to a temperature at which the agar medium is ready to be solidified is poured into and mixed with the solution. Thereafter, the mixture is left to stand until the mixture is solidified and then cultured for 48 hours in an incubation room kept at 35° C. The number of viable cells in the sample prepared as above is counted and multiplied by 1,000, and the obtained value is adopted as the number of viable cells.

The number of viable cells in the sample counted before the start of the culture solution transport is denoted as F1, the number of viable cells in the sample counted 24 hours after transport is denoted as F2, and the water purification performance is determined by water purification performance $F = -LOG(F2/F1) \times 10$ and evaluated based on the following evaluation standards.

A: $10 \leq F$
B: $7 \leq F < 10$
C: $3 \leq F < 7$
D: $1 \leq F < 3$
E: $F < 1$ Nutrient Inactivation Performance in Culture Solution The iron concentration in the culture solution is measured by ion chromatography.

The iron concentration in the sample measured before the start of the culture solution transport is denoted as D1, the iron concentration in the sample measured 24 hours after transport is denoted as D2, and the nutrient inactivation performance is determined by inactivation performance of nutrient $D = D2/D1$ and evaluated based on the following evaluation standards.

A: $0.9 \leq D$
B: $0.8 \leq D < 0.9$
C: $0.6 \leq D < 0.8$
D: $0.4 \leq D < 0.6$
E: $D < 0.4$

TABLE 1

| Photocatalyst particles | | Visi characteristics | | | | | IR characteristics |
|---|---|---|---|---|---|---|---|
| Particle diameter DC (nm) | BET specific surface area $m^2/g$ | Wavelength Absorbance at 450 nm | Wavelength Absorbance at 500 nm | Wavelength Absorbance at 550 nm | Wavelength Absorbance at 600 nm | Wavelength Absorbance at 700 nm | Absorption peak wave number ($cm^{-1}$) |
| Metatitanic acid particles MTA1 | | | | | | | |
| 35 | 250 | 0.48 | 0.34 | 0.25 | 0.14 | 0.10 | 2,850/2,920 |
| Metatitanic acid particles MTA2 | | | | | | | |
| 65 | 140 | 0.48 | 0.28 | 0.22 | 0.10 | 0.06 | 2,854/2,924 |

TABLE 1-continued

| Photocatalyst particles | | | Visi characteristics | | | | | IR characteristics |
|---|---|---|---|---|---|---|---|---|
| | Particle diameter DC (nm) | BET specific surface area $m^2/g$ | Wavelength Absorbance at 450 nm | Wavelength Absorbance at 500 nm | Wavelength Absorbance at 550 nm | Wavelength Absorbance at 600 nm | Wavelength Absorbance at 700 nm | Absorption peak wave number ($cm^{-1}$) |
| Metatitanic acid particles MTA3 | 130 | 55 | 0.39 | 0.23 | 0.20 | 0.08 | 0.03 | 2,848/2,918 |
| Titanium oxide particles TO1 | 8 | 185 | 0.44 | 0.31 | 0.26 | 0.13 | 0.07 | 2,849/2,917 |
| Titanium oxide particles TO2 | 20 | 130 | 0.39 | 0.24 | 0.20 | 0.11 | 0.03 | 2,853/2,917 |
| Titanium oxide particles TO3 | 160 | 20 | 0.31 | 0.17 | 0.14 | 0.08 | 0.02 | 2,852/2,919 |
| Titanium oxide aerogel particles TOAG1 | 80 | 350 | 0.37 | 0.3 | 0.2 | 0.11 | 0.06 | 2,855/2,920 |
| Silica-titania composite aerogel particles STAG1 | 30 | 680 | 0.38 | 0.21 | 0.15 | 0.06 | 0.02 | 2,847/2,921 |
| Silica-titania composite aerogel particles STAG2 | 35 | 480 | 0.4 | 0.24 | 0.17 | 0.1 | 0.05 | 2,851/2,923 |

TABLE 2

| | | Photocatalyst-supporting porous particles | | | | Condition of water quality evaluation Culture solution Volume L |
|---|---|---|---|---|---|---|
| | Photocatalyst particles | Amount of supported photocatalyst particles % By mass | Visible light transmittance % | BET specific surface area $m^2/g$ | Volume of sheet filled with particles $\times 10^{-5}\ m^3$ | |
| Example A1 | MTA1 | 30 | 20 | 69 | 35 | 3 |
| | | 30 | 20 | 69 | 110 | 3 |
| | | 30 | 20 | 69 | 184 | 3 |
| | | 30 | 20 | 69 | 138 | 2 |
| | | 30 | 20 | 69 | 184 | 10 |
| | | 30 | 20 | 69 | 1,150 | 20 |
| | | 30 | 20 | 69 | 35 | 20 |
| Example A2 | MTA1 | 45 | 14 | 102 | 35 | 3 |
| Example A3 | MTA1 | 3 | 28 | 8 | 35 | 3 |
| | | 3 | 28 | 8 | 35 | 20 |
| | | 3 | 28 | 8 | 13 | 20 |
| Example A4 | MTA2 | 33 | 21 | 43 | 35 | 3 |
| Example A5 | MTA3 | 31 | 22 | 17 | 35 | 3 |
| | | | | | 4 | 20 |
| Example A6 | TO1 | 31 | 19 | 60 | 35 | 3 |
| Example A7 | TO2 | 55 | 4 | 35 | 35 | 3 |
| Example A8 | TO3 | 30 | 22 | 7 | 35 | 3 |
| | | | | | 13 | 30 |
| Example B1 | MTA1 | 20 | 19 | 50 | 4.0 | 5 |
| Example B2 | TOAG1 | 14 | 15 | 55 | 4.0 | 5 |
| Example B3 | STAG1 | 17 | 18 | 105 | 4.0 | 5 |
| Example B4 | STAG2 | 16 | 18 | 90 | 4.0 | 5 |
| Comparative Example 1 | ST-01 | 30 | 20 | 60 | 34.5 | 3 |
| Comparative Example 2 | Copper-supporting titanium oxide | 30 | 18 | 8 | 34.5 | 3 |

| | Condition of water quality evaluation | | | | Result of water quality evaluation | |
|---|---|---|---|---|---|---|
| | Culture solution | | | | | |
| | Supplied amount L/min | Flow rate L/min/$m^3$ | SA/Vol $\times 10^{-3}$ kg/L | S/Vol $m^2$/L | Water purification performance | Nutrient inactivation performance |
| Example A1 | 0.4 | 1,159 | 30 | 6,903 | A | A |
| | 0.4 | 362 | 96 | 22,091 | A | A |
| | 0.4 | 217 | 160 | 36,818 | B | A |
| | 0.3 | 203 | 240 | 55,228 | B | B |
| | 1.2 | 652 | 48 | 11,046 | A | A |
| | 0.3 | 24 | 150 | 34,517 | A | B |
| | 2.3 | 6,667 | 5 | 1,036 | C | A |

TABLE 2-continued

|  |  |  |  |  |  |  |
|---|---|---|---|---|---|---|
| Example A2 | 0.4 | 1,159 | 60 | 13,548 | A | A |
| Example A3 | 0.4 | 1,159 | 1.2 | 328 | A | A |
|  | 0.3 | 1,353 | 0.11 | 30 | B | A |
|  | 0.3 | 2,174 | 0.07 | 18 | C | A |
| Example A4 | 0.4 | 1,159 | 35 | 4,584 | A | A |
| Example A5 | 0.4 | 1,159 | 32 | 1,738 | A | A |
|  | 0.3 | 7,378 | 0.5 | 29 | B | A |
| Example A6 | 0.4 | 1,159 | 32 | 6,134 | A | A |
| Example A7 | 0.4 | 1,159 | 85 | 5,414 | A | B |
| Example A8 | 0.4 | 1,159 | 30 | 700 | A | A |
|  | 0.3 | 2,174 | 1.1 | 26 | B | A |
| Example B1 | 0.3 | 870 | 9.4 | 2,346 | A | A |
| Example B2 | 0.3 | 870 | 5.5 | 2,148 | B | A |
| Example B3 | 0.3 | 870 | 7.3 | 4,514 | A | A |
| Example B4 | 0.3 | 870 | 6.7 | 3,751 | A | A |
| Comparative Example 1 | 0.4 | 1,159 | 30 | 6,003 | E | A |
| Comparative Example 2 | 0.4 | 1,159 | 59 | 1,573 | D | A |

As is evident from the above results, compared to the photocatalyst-supporting porous particles of comparative examples, the photocatalyst-supporting porous particles of the present examples more sterilize and purify the culture solution while further inhibiting the inactivation of the culture components in the culture solution.

Furthermore, it is also understood that accordingly, compared to the photocatalyst-supporting porous particles of comparative example, the photocatalyst-supporting porous particles of the present examples more sterilize and purify the aqueous medium while further inhibiting the insolubilization of an organic substance or an ion in an aqueous medium.

In addition, it is understood that the photocatalyst-supporting porous particles of the present examples are suitable as water purification particles or medium particles for water culture.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Water purification particles comprising:
   porous particles; and
   photocatalyst particles formed of titanium-based compound particles that are supported on the porous particles, have absorption at a wavelength of 500 nm in a visible absorption spectrum, and have an absorption peak at 2,700 $cm^{-1}$ to 3,000 $cm^{-1}$ in an infrared absorption spectrum,
   wherein a metal compound having a metal atom and a hydrocarbon group is bonded to the surface of each of the titanium-based compound particles through an oxygen atom.

2. The water purification particles according to claim 1, wherein an amount of the supported photocatalyst particles with respect to the water purification particles is equal to or greater than 1% by mass and equal to or smaller than 60% by mass.

3. The water purification particles according to claim 2, wherein the amount of the supported photocatalyst particles with respect to the water purification particles is equal to or greater than 5% by mass and equal to or smaller than 50% by mass.

4. The water purification particles according to claim 1, wherein a visible light transmittance of the water purification particles is equal to or higher than 1% and equal to or lower than 80%.

5. The water purification particles according to claim 4, wherein the visible light transmittance of the water purification particles is equal to or higher than 10% and equal to or lower than 30%.

6. The water purification particles according to claim 1, wherein a BET specific surface area of the water purification particles is equal to or greater than 1 $m^2/g$ and equal to or smaller than 300 $m^2/g$.

7. The water purification particles according to claim 6, wherein the BET specific surface area of the water purification particles is equal to or greater than 10 $m^2/g$ and equal to or smaller than 200 $m^2/g$.

8. The water purification particles according to claim 1, wherein an average particle diameter of the water purification particles is equal to or greater than 1 mm.

9. A water culture apparatus comprising:
   a container that holds a culture solution containing nutrients for a plant;
   a medium member that is for growing the plant; and
   the water purification particles according to claim 1 that are disposed in a position where the particles contact the culture solution and are exposed to visible light.

10. The water culture apparatus according to claim 9, wherein a ratio of an amount of the supported photocatalyst particles in the water purification particles (kg) to a volume of the culture solution held in the container (L) (amount of supported photocatalyst particles/volume of culture solution) is equal to or higher than $0.04 \times 10^{-3}$ kg/L and equal to or lower than $300 \times 10^{-3}$ kg/L.

11. The water culture apparatus according to claim 10, wherein the ratio of the amount of the supported photocatalyst particles in the water purification particles (kg) to the volume of the culture solution held in the container (L) (amount of supported photocatalyst particles/volume of culture solution) is equal to or higher than $0.08 \times 10^{-3}$ kg/L and equal to or lower than $200 \times 10^{-3}$ kg/L.

12. The water culture apparatus according to claim 9, wherein a ratio of a total surface area of the water purification particles (m²) to a volume of the culture solution held in the container (L) (total surface area of water purification particles/volume of culture solution) is equal to or higher than 0.4 m²/L and equal to or lower than 140,000 m²/L.

13. The water culture apparatus according to claim 12, wherein the ratio of the total surface area of the water purification particles (m²) to the volume of the culture solution held in the container (L) (total surface area of water purification particles/volume of culture solution) is equal to or higher than 8 m²/L and equal to or lower than 70,000 m²/L.

14. The water culture apparatus according to claim 9, further comprising:
a circulation device that circulates the culture solution held in the container.

15. The water culture apparatus according to claim 14, wherein a calculative flow rate of the culture solution flowing through the water purification particles that is calculated from the amount of the culture solution supplied to the container by the circulation device per unit time (L/min) and the volume of the water purification particles (m³) is equal to or higher than 9 L/min/m³ and equal to or lower than 30,000 L/min/m³.

16. The water culture apparatus according to claim 15, wherein the calculative flow rate of the culture solution flowing through the water purification particles that is calculated from the amount of the culture solution supplied to the container by the circulation device per unit time (L/min) and the volume of the water purification particles (m³) is equal to or higher than 25 L/min/m³ and equal to or lower than 5,500 L/min/m³.

17. The water culture apparatus according to claim 9, wherein the water purification particles are disposed in the container, in a position where the entirety or some of the water purification particles do not overlap the medium member in a case where the particles are seen in a depth direction of the container.

18. The water culture apparatus according to claim 9, wherein the water purification particles are disposed in the container, in a position where the entirety or some of the water purification particles overlap the medium member in a case where the particles are seen in a depth direction of the container, and
the medium member has visible light-transmitting properties.

19. The water culture apparatus according to claim 9, further comprising:
a light irradiation device that irradiates at least the water purification particles with visible light.

20. Medium particles for water culture comprising:
porous particles; and
photocatalyst particles formed of titanium-based compound particles that are supported on the porous particles, have absorption at a wavelength of 500 nm in a visible absorption spectrum, and have an absorption peak at 2,700 cm⁻¹ to 3,000 cm⁻¹ in an infrared absorption spectrum,
wherein a metal compound having a metal atom and a hydrocarbon group is bonded to the surface of each of the titanium-based compound particles through an oxygen atom.

21. A water culture apparatus comprising:
a container that holds a culture solution containing nutrients for a plant;
a container that holds a culture solution for raising seedling of the plant; and
a medium member for growing the plant that is disposed in a position where the medium member contacts the culture solution and is exposed to visible light, and has the medium particles for water culture according to claim 20.

22. A water purification apparatus comprising:
a container that holds an aqueous medium; and
the water purification particles according to claim 1 that are disposed in a position where the particles contact the aqueous medium and are exposed to visible light.

* * * * *